US008433942B2

(12) United States Patent
Ouchi et al.

(10) Patent No.: US 8,433,942 B2
(45) Date of Patent: Apr. 30, 2013

(54) STORAGE APPARATUS AND POWER CONSUMPTION ESTIMATION METHOD

(75) Inventors: Katsumi Ouchi, Kawasaki (JP); Masanori Takada, Yokohama (JP); Akira Yamamoto, Sagamihara (JP)

(73) Assignee: Hitachi, Ltd., Takyo (JP)

( * ) Notice: Subject to any disclaimer, the term of this patent is extended or adjusted under 35 U.S.C. 154(b) by 508 days.

(21) Appl. No.: 12/679,228

(22) PCT Filed: Mar. 5, 2010

(86) PCT No.: PCT/JP2010/001573
§ 371 (c)(1),
(2), (4) Date: Mar. 19, 2010

(87) PCT Pub. No.: WO2011/108031
PCT Pub. Date: Sep. 9, 2011

(65) Prior Publication Data
US 2011/0307721 A1    Dec. 15, 2011

(51) Int. Cl.
G06F 1/00    (2006.01)
G06F 11/30   (2006.01)
G11B 15/10   (2006.01)

(52) U.S. Cl.
USPC .......................... 713/340; 713/300; 360/137

(58) Field of Classification Search .................. None
See application file for complete search history.

(56) References Cited

U.S. PATENT DOCUMENTS

| 8,250,390 B2 * | 8/2012 | Takada et al. .............. 713/320 |
| 2009/0198385 A1 | 8/2009 | Oe et al. |
| 2009/0316541 A1 | 12/2009 | Takada et al. |
| 2010/0050008 A1 | 2/2010 | Allalouf et al. |
| 2011/0161712 A1 * | 6/2011 | Athalye et al. .............. 713/340 |
| 2011/0208622 A1 * | 8/2011 | Gopisetty et al. .............. 705/30 |

FOREIGN PATENT DOCUMENTS

| EP | 2136285 A3 | 12/2009 |
| JP | 2009159712 A | 7/2009 |
| JP | 20103099 A | 1/2010 |

OTHER PUBLICATIONS

Molaro, D., Payer, H., Le Moal, D., "Tempo: Disk Drive Power Consumption Characterization And Modeling," 13th IEEE Annual Symposium on Consumer Electronics, May 25, 2009-May 28, 2009, pp. 246-250, XP002596337, Kyoto, Japan.

Zedlewski, J., Sobti, S., Garg, N., Zheng, F., "Modeling Hard-Disk Power Consumption," Proceedings Of The Second Usenix Conference on File and Storage Technologies, Mar. 31, 2003, pp. 217-230, XP002596338, San Francisco, CA.

Hylick, A., Sohan, R., Rice, A., Jones, B., "An Analysis of Hard Drive Energy Consumption," IEEE International Symposium on Modeling, Analysis and Simulation of Computers and Telecommunication Systems, Mascots Sep. 8, 2008-Sep. 10, 2008, pp. 1-10, XP002596339, Baltimore, MD.

(Continued)

Primary Examiner — Ji H Bae
(74) Attorney, Agent, or Firm — Volpe And Koenig, P.C.

(57) ABSTRACT

Proposed are a storage apparatus and a power consumption estimation method capable of easily and accurately estimating the power consumption of a physical drive without having to use a wattmeter. Operational information concerning a seek amount and a data transfer amount in the relevant hard disk drive which are internally recorded and retained by the respective hard disk drives is collected from each of the hard disk drives, and power consumption of each of the hard disk drives is estimated based on the acquired operational information of each of the hard disk drives.

4 Claims, 31 Drawing Sheets

OTHER PUBLICATIONS

Mohan, V., Gurumurthi, S., Stan, M.R., "FlashPower: A Detailed Power Model for NAND Flash Memory," Design, Automation & Test in Europe Conference & Exhibition, Mar. 8, 2010-Mar. 12, 2010, pp. 502-507, XP002596340, Dresden, Germany.

Allalouf, Miriam et al. "Storage Modeling for Power Estimation" SYSTOR 2009, Israeli Experimental System Conference pp. 1-11.

Zedlewski, John et al. "Modeling Hard-Disk Power Consumption" Proceedings of 2nd Usenix Conference on File and Storage Technologies, 2003 pp. 1-14.

U.S. Appl. No. 12/351,232, filed Jan. 9, 2009 First Named Inventor: Takada, Masanori.

* cited by examiner

| DRIVE NUMBER | DRIVE MODEL NUMBER | USAGE STATE | POWER STATUS |
|---|---|---|---|
| 0 | A | IN USE | SPIN-UP |
| 1 | A | IN USE | SPIN-UP |
| 2 | A | IN USE | SPIN-UP |
| 3 | A | IN USE | SPIN-UP |
| 4 | B | IN USE | SPIN-DOWN |
| 5 | B | IN USE | SPIN-DOWN |
| 6 | C | SPARE | SPIN-UP |
| 7 | C | SPARE | SPIN-UP |
| ... | ... | ... | ... |
| 61A | 61B | 61C | 61D |

| DRIVE MODEL NUMBER | SPIN-DOWN POWER [W] | IDLE POWER [W] | SEEK OPERATION ADDITIONAL POWER [W] | DATA TRANSFER ADDITIONAL POWER [W] |
|---|---|---|---|---|
| A | 4.3 | 14.1 | 4.9 | 1.9 |
| B | 2.9 | 8.9 | 5.1 | 2.3 |
| C | 3.5 | 11.4 | 5.6 | 2.3 |
| ... | ... | ... | ... | ... |

| DRIVE MODEL NUMBER | MAXIMUM SEEK DISTANCE | MAXIMUM DATA TRANSFER AMOUNT [BYTES] |
|---|---|---|
| A | 79,751,975 | 3,912,725,971,050 |
| B | 97,519,757 | 8,975,109,175,078 |
| C | 87,957,151 | 9,723,597,517,987 |
| ... | ... | ... |

| DRIVE NUMBER | COUNTER NAME | PREVIOUS COUNTER VALUE | COUNTER VALUE INCREASE |
|---|---|---|---|
| 0 | SEEKS > =2/3 | 37,959 | 2,350 |
| | SEEKS > =1/3 AND < 2/3 | 12,624 | 528 |
| | SEEKS > =1/6 AND < 1/3 | 9,002 | 1,479 |
| | SEEKS > =1/12 AND < 1/6 | 50,129 | 2,098 |
| | SEEKS > 0 AND < 1/12 | 5,738 | 947 |
| | TOTAL READ BYTES | 9,433,179,457 | 2,818,037,229 |
| | TOTAL WRITE BYTES | 23,975,917,235 | 1,985,395,057 |
| 1 | SEEKS >= 2/3 | 5,795,276 | 7,926 |
| | SEEKS >= 1/3 AND < 2/3 | 8,765,299 | 6,198 |
| ... | ... | ... | ... |

64A  64B  64C  64D  64

| PART | AVERAGE POWER CONSUMPTION [W] | DRIVE POWER INCREASE | | NORMAL POWER CONSUMPTION [W] |
|---|---|---|---|---|
| | | SEEK OPERATION POWER INCREASE [W] | DATA TRANSFER POWER INCREASE [W] | |
| DRIVE 0 | 11.5 | 5.4 | 1.9 | 4.2 |
| DRIVE 1 | 12.3 | 5.2 | 2.5 | 4.6 |
| ... | ... | ... | ... | ... |
| ... | ... | ... | ... | ... |
| POWER SUPPLY MODULE 0 | 28.0 | | | |
| POWER SUPPLY MODULE 1 | 28.0 | | | |
| EXPANSION ENCLOSURE | 238.5 | | | |

D1

| DATE AND TIME | PART | AVERAGE POWER CONSUMPTION [W] | DRIVE POWER INCREASE | | NORMAL POWER CONSUMPTION [W] |
| --- | --- | --- | --- | --- | --- |
| | | | SEEK OPERATION POWER INCREASE [W] | DATA TRANSFER POWER INCREASE [W] | |
| 2009/11/01 14:26 | DRIVE 0 | 11.5 | 5.4 | 1.9 | 4.2 |
| | ... | ... | ... | ... | ... |
| | EXPANSION ENCLOSURE | 238.5 | / | / | / |
| 2009/11/01 14:27 | DRIVE 0 | 11.5 | 5.4 | 1.9 | 4.2 |
| | ... | ... | ... | ... | ... |
| | EXPANSION ENCLOSURE | 238.5 | / | / | / |
| ... | ... | ... | ... | ... | ... |

70A  70B  70C  70D  70E  70F
70

| VCM OPERATION START TIME [us] | HEAD AMP OPERATION START TIME [us] | VCM CUMULATIVE OPERATING TIME [us] | HEAD AMP CUMULATIVE OPERATING TIME [us] |
|---|---|---|---|
| 25,575,951 | 15,901,855 | 11,046,412 | 7,651,097 |
| 110A | 110B | 110C | 110D |

| DRIVE MODEL NUMBER | SPIN-DOWN POWER [W] | IDLE POWER [W] | VCM OPERATION ADDITIONAL POWER [W] | HEAD AMP OPERATION ADDITIONAL POWER [W] |
|---|---|---|---|---|
| A | 4.3 | 14.1 | 4.9 | 1.9 |
| B | 2.9 | 8.9 | 5.1 | 2.3 |
| C | 3.5 | 11.4 | 5.6 | 2.3 |
| ... | ... | ... | ... | ... |

| DRIVE NUMBER | VCM OPERATING TIME [us] | HEAD AMP OPERATING TIME [us] |
|---|---|---|
| 0 | 25,575,951 | 15,901,855 |
| 1 | 11,046,412 | 7,651,097 |
| 2 | 31,945,490 | 29,057,112 |
| ... | ... | ... |

| PART | AVERAGE POWER CONSUMPTION [W] | DRIVE POWER INCREASE | | NORMAL POWER CONSUMPTION [W] |
|---|---|---|---|---|
| | | VCM OPERATION POWER INCREASE [W] | HEAD AMP OPERATION POWER INCREASE [W] | |
| DRIVE 0 | 11.5 | 5.4 | 1.9 | 4.2 |
| DRIVE 1 | 12.3 | 5.2 | 2.5 | 4.6 |
| ... | ... | ... | ... | ... |
| ... | ... | ... | ... | ... |
| POWER SUPPLY MODULE 0 | 28.0 | | | |
| POWER SUPPLY MODULE 1 | 28.0 | | | |
| EXPANSION ENCLOSURE | 238.5 | | | |

D2

| READ OPERATION EXECUTION CHIP COUNT | WRITE OPERATION EXECUTION CHIP COUNT | ERASE OPERATION EXECUTION CHIP COUNT | |
|---|---|---|---|
| 5,951 | 3,525 | 430 | 150 |
| 150A | 150B | 150C | |

| DRIVE NUMBER | DRIVE MODEL NUMBER | DRIVE TYPE | USAGE STATE | HDD POWER STATUS |
|---|---|---|---|---|
| 0 | A | HDD | IN USE | SPIN-UP |
| 1 | A | HDD | IN USE | SPIN-UP |
| 2 | A | HDD | IN USE | SPIN-UP |
| 3 | A | HDD | IN USE | SPIN-UP |
| 4 | B | HDD | SPARE | SPIN-DOWN |
| 5 | B | HDD | SPARE | SPIN-DOWN |
| 6 | D | SSD | IN USE | — |
| 7 | D | SSD | IN USE | — |
| ... | ... | ... | ... | ... |
| 161A | 161B | 161C | 161D | 161E |

| DRIVE MODEL NUMBER | IDLE POWER [W] | DURING READ | | DURING WRITE | | DURING ERASE | |
|---|---|---|---|---|---|---|---|
| | | POWER INCREASE [mW] | REQUIRED TIME [us] | POWER INCREASE [mW] | REQUIRED TIME [us] | POWER INCREASE [mW] | REQUIRED TIME [us] |
| D | 14.1 | 25 | 60 | 28 | 800 | 50 | 1,500 |
| E | 8.9 | 25 | 60 | 28 | 800 | 50 | 1,500 |
| F | 11.4 | 20 | 65 | 22 | 900 | 46 | 1,500 |
| ... | ... | ... | ... | ... | ... | ... | ... |

| DRIVE NUMBER | (HDD) VCM CUMULATIVE OPERATING TIME [us] | (HDD) HEAD AMP CUMULATIVE OPERATING TIME [us] | (SSD) READ OPERATION EXECUTION CHIP COUNT | (SSD) WRITE OPERATION EXECUTION CHIP COUNT | (SSD) ERASE OPERATION EXECUTION CHIP COUNT |
|---|---|---|---|---|---|
| 0 | 25,575,951 | 15,901,855 | — | — | — |
| 1 | 11,046,412 | 7,651,097 | — | — | — |
| 2 | 31,945,490 | 29,057,112 | — | — | — |
| 3 | 11,046,412 | 7,651,097 | — | — | — |
| 4 | — | — | 5,951 | 3,525 | 430 |
| 5 | — | — | 6,412 | 1,097 | 592 |
| ... | ... | ... | ... | ... | ... |
| 164A | 164B | 164C | 164D | 164E | 164F |

FIG.46

| PART | AVERAGE POWER CONSUMPTION [W] | DRIVE POWER INCREASE | | NORMAL POWER CONSUMPTION [W] |
|---|---|---|---|---|
| | | HDD POWER INCREASE [W] | SSD POWER INCREASE [W] | |
| DRIVE 0 | 11.5 | 7.3 | — | 4.2 |
| DRIVE 1 | 12.3 | 7.7 | — | 4.6 |
| ... | ... | ... | ... | ... |
| DRIVE 13 | 7.1 | — | 4.8 | 2.3 |
| DRIVE 14 | 6.5 | — | 4.2 | 2.3 |
| POWER SUPPLY MODULE 0 | 28.0 | | | |
| POWER SUPPLY MODULE 1 | 28.0 | | | |
| EXPANSION ENCLOSURE | 238.5 | | | |

| OUTPUT LOAD [W] | POWER LOSS [W] |
|---|---|
| 50 | 13 |
| 100 | 18 |
| 150 | 24 |
| 200 | 31 |
| 250 | 39 |
| 300 | 48 |
| 350 | 58 |
| 400 | 70 |
| 450 | 84 |
| 500 | 100 |

170

STORAGE APPARATUS AND POWER CONSUMPTION ESTIMATION METHOD

TECHNICAL FIELD

The present invention relates to a storage apparatus and a power consumption estimation method, and can be suitably applied to a storage apparatus mounted with one or more physical drives.

BACKGROUND ART

In recent years, pursuant to the increase in the data amount, the power of data centers is increasing drastically. In connection with this, in addition to services as the primary IT (Information Technology) device, storage apparatuses are also being demanded of power saving. In order to realize power saving of a storage, it is necessary to accurately monitor the power consumption of the storage. Here, it is necessary to accurately obtain the power consumption of the device according to its operational status in smallest configuration part units as possible.

As the method of measuring the power of a storage, conventionally, it was standard to connect a wattmeter to the power supply line for supplying power to the storage. In recent years, however, a method is known for estimating the power consumption of a storage apparatus or a storage device without using the wattmeter.

For example, Patent Literature 1 discloses technology where a power consumption monitoring server includes a table showing the relation of the load information and power of a storage device, and estimating the power of the storage device based on the load information collected from the storage device.

Moreover, Non Patent Literature 1 discloses a method of estimating the power of a storage by converting the frontend load of the storage into a backend load, and inter-polating the table data showing the relation of the backend load and power.

Further, Non Patent Literature 2 discloses a method of estimating the power consumption by performing a detailed status simulation based on an I/O trace regarding a small hard disk drive.

CITATION LIST

Patent Literature

[PTL 1] Japanese Unexamined Patent Publication No. 2009-159712

Non Patent Literature

[NPL 1] "Storage Modeling for Power Estimation," SYSTOR 2009, Israeli Experimental System Conference

[NPL 2] "Modeling Hard-Disk Power Consumption," Proceedings of $2^{nd}$ USENIX Conference on File AND STORAGE Technologies, 2003

SUMMARY OF INVENTION

Technical Problem

Nevertheless with the technology disclosed in Patent Literature 1 and Non Patent Literature 1, it is necessary to increase the table data showing the relation of the load and power in order to increase the estimation accuracy, and there is a problem in that the development cost will increase in the course of commercialization.

Moreover, with the technology disclosed in Patent Literature 1 and Non Patent Literature 1, in order to add a physical drive that is subject to support after commercialization, it is necessary to create new table data to which information concerning that physical drive is added, and perform operations for inputting such table data into the storage apparatus, and there is a problem in that the maintenance cost will increase.

In addition, with the technology disclosed in Non Patent Literature 1, there is a problem in that the estimation accuracy depends on the accuracy of conversion from the frontend load to backend load.

Moreover, if the technology disclosed in Non Patent Literature 2 is to be applied to a storage mounted with several hundred hard disk drives, the storage controller needs to constantly acquire the I/O traces of several hundred hard disk drives, and it is un-realistic.

As described above, with the foregoing conventional methods, there is a problem in that the power consumption of the physical drive could not be easily and accurately obtained.

The present invention was devised in view of the foregoing points. Thus, an object of this invention is to propose a storage apparatus and a power consumption estimation method capable of easily and accurately estimating the power consumption of a physical drive without having to use a wattmeter.

Solution to the Problem

In order to achieve the foregoing object, the present invention provides a storage apparatus including one or more hard disk drives as a physical drive, and for providing a storage area of the one or more hard disk drives to a host computer. This storage apparatus comprises an operational information collection unit for collecting, from each of the hard disk drives, operational information concerning a seek amount and a data transfer amount in the relevant hard disk drive which are internally recorded and retained by the respective hard disk drives, and a power consumption estimation unit for estimating the power consumption of each of the hard disk drives based on the acquired operational information of each of the hard disk drives.

The present invention additionally provides a power consumption estimation method for estimating the power consumption of a physical drive in a storage apparatus including one or more hard disk drives as the physical drive, and for providing a storage area of the one or more hard disk drives to a host computer. This power consumption estimation method comprises a first step of collecting, from each of the hard disk drives, operational information concerning a seek amount and a data transfer amount in the relevant hard disk drive which are internally recorded and retained by the respective hard disk drives, and a second step of estimating the power consumption of each of the hard disk drives based on the acquired operational information of each of the hard disk drives.

Advantageous Effects of Invention

According to the present invention, the power consumption of a physical drive can be easily and accurately estimated without having to use a wattmeter.

BRIEF DESCRIPTION OF DRAWINGS

[FIG. 6] A conceptual diagram explaining the HDD power specification management table according to the first embodiment.

[FIG. 7] A conceptual diagram explaining the HDD operational specification management table according to the first embodiment.

[FIG. 8] A conceptual diagram explaining the drive operation recording table according to the first embodiment.

[FIG. 26] A conceptual diagram explaining the HDD power specification management table.

[FIG. 27] A conceptual diagram explaining the drive operation recording table according to the second embodiment.

[FIG. 29] A conceptual diagram explaining the power consumption information according to the second embodiment.

[FIG. 43] A conceptual diagram explaining the SSD power specification management table.

[FIG. 44] A conceptual diagram explaining the drive operation recording table according to the third embodiment.

[FIG. 46] A conceptual diagram explaining the power consumption information according to the third embodiment.

[FIG. 47] A conceptual diagram explaining another embodiment.

DESCRIPTION OF EMBODIMENTS

An embodiment of the present invention is now explained in detail with reference to the attached drawings.

(1) First embodiment 1-1) Configuration of Computer System in this Embodiment

Figure 1:
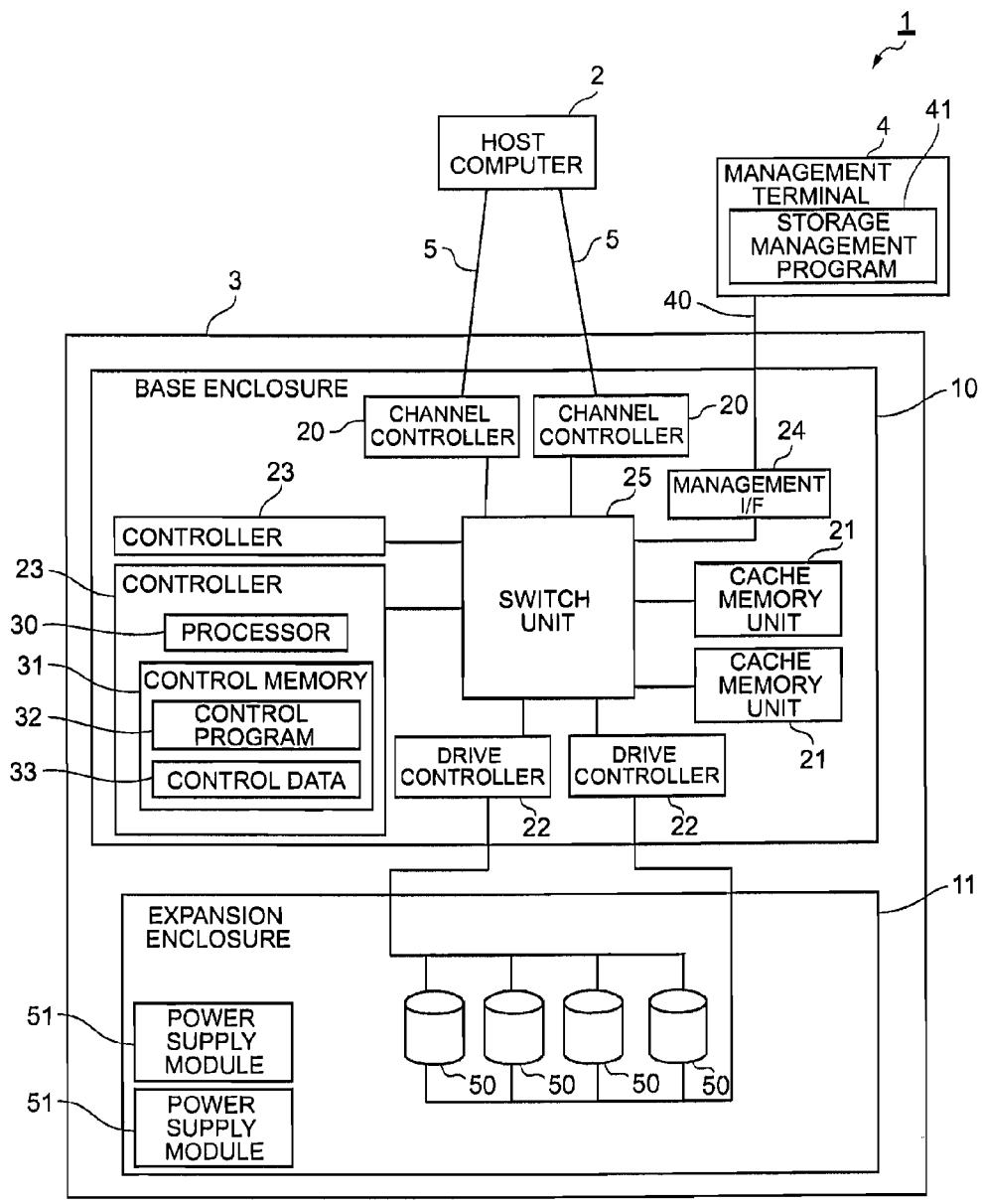
[FIG. 1] A block diagram showing the overall configuration of the computer system according to the first embodiment.

FIG. 1 shows the overall computer system 1 according to this embodiment. The computer system 1 comprises a host computer 2, a storage apparatus 3 and a management terminal 4.

The host computer 2 is a computer device comprising information processing resources such as a CPU (Central Processing Unit) and a memory and is configured, for example, from a personal computer, a workstation or a mainframe. The host computer 2 is connected to the storage apparatus 3 via a host interface 5.

The storage apparatus 3 is configured from a base enclosure 10 and an expansion enclosure 11. The base enclosure 10 comprises, for improved availability, redundant channel controllers 20, cache memory units 21, drive controllers 22, controllers 23 and management interface units 24, and a switch 25 for mutually connecting the foregoing components.

The channel controller 20 is an interface to be connected to the host computer 2, and receives an access request (for instance, an access request in block or file units) from the host computer 2. The channel controller 20 additionally including a function for performing protocol conversion between a protocol (for instance, FC (Fibre Channel) that is used for connecting to the host computer 2, and a protocol (for instance, PCI (Peripheral Component Interconnect)) that is used inside the storage apparatus 3, and controlling the data transfer between the host computer 2 and the cache memory unit 21.

The cache memory unit 21 provides a storage area for temporarily storing the write data input from the host computer 2 into the storage apparatus 3, and the read data output from the storage apparatus 3 to the host computer 2. The cache memory unit 21 is configured, for example, from a nonvolatile memory, or a volatile memory that is backed up by a battery.

The drive controller 22 controls the I/O of data to and from the physical drives 50 mounted inside the expansion enclosure 11. The drive controller 22 includes a function of performing protocol conversion between a protocol (for instance, FC or SAS (Serial Attached SCSI)) used for connecting to the physical drive 50, and a protocol used inside the storage apparatus 3, and controlling the data transfer between the physical drives 50 and the cache memory unit 21.

The controller 23 comprises a processor 30 and a control memory 31. The processor 30 comprises one or more processor cores, and controls the operation of the overall storage apparatus 3 and the data transfer within the storage apparatus 3 based on the storage control program 32 that is stored and retained in the control memory 31. The processor 30 additionally comprises a timer not shown, and is able to acquire the current time from the timer. The control memory 31 stores the foregoing storage control program 32, and control data 33 that is used for controlling the storage apparatus 3.

The management interface unit 24 is an interface to the management terminal 4 and is configured, for example, from a LAN (Local Area Network) card.

The switch unit 25 includes a function of switching the data transfer path among the channel controller 20, the cache memory unit 21 and the drive controller 22 based on commands from the controller 23 and is configured, for example, from a cross-bar switch.

The management terminal 4 is a computer device comprising information processing resources such as a CPU and a memory, and is connected to the management interface unit 24 of the storage apparatus 3 via a communication network (for instance, LAN) 40. The management terminal 4 is loaded with a storage management program 41, and the storage apparatus 3 is managed based on the storage management program 41. The management terminal 4 is also loaded with a Web browser, and is able to display the power consumption in the expansion enclosure 12 of the storage apparatus 3 based on the Web browser as described later.

The base enclosure 10 is mounted with a power supply module (not shown) for converting the AC voltage that is supplied from the outside into a DC voltage. The DC voltage that is output from the power supply module is converted into a lower voltage as necessary and supplied to the respective components inside the base enclosure 10.

Meanwhile, the expansion enclosure 11 comprises one or more physical drives 50 and a power supply module 51. The physical drive 50 is configured from an expensive high-end hard disk drive such as a SCSI (Small Computer System Interface) disk or an inexpensive large-capacity hard disk drive such as a SATA (Serial AT Attachment) disk, and connected to the drive controller 22 of the base enclosure 10 via a switch not shown.

The physical drives 50 are operated based on a RAID (Redundant Arrays of Inexpensive Disks) method by the driver controller 22 of the base enclosure 10. A RAID group is configured from a plurality of physical drives 50, and one or more logical devices as logical volumes are defined in a physical storage area provided by the physical drives 50 configuring one RAID group. Data is stored in block units of a prescribed size or file units in the logical device.

In the case of this embodiment, each physical drive 50 is loaded with a function of internally recording operational information concerning the seek distance and data transfer amount in the respective self-physical drives 50. Specifically, each physical drive 50 internally records and retains, as operational information concerning the seek distance, the number of times that the seek operation was performed for each section upon sectionalizing the seek distance to five ranges; specifically, $2/3$ or more of the disk radius, $1/3$ or more and less than $2/3$ of the disk radius, $1/6$ or more and less than $1/3$ of the disk radius, $1/12$ or more and less than $1/6$ of the disk radius, and more than 0 and less than $1/12$ of the disk radius. Moreover, each physical drive 50 internally records and retains the data amount of the read data that was transferred to the drive controller 22, and the data amount of the write data that was transferred from the drive controller 22. The foregoing operational information can be collected from the respective physical drives 50 using a dedicated SCSI command (Log Sense command).

If there is no access from the host computer 2 to the physical drive 50 for a given period of time, in order to ensure the reliability of the recorded data, the internal program of the physical drive 50 unit performs verification operation of the recorded data periodically. Since the seek operation and data transfer will occur during the foregoing operation, they will be reflected in the foregoing operational information.

The power supply module 51 includes a function for converting the AC voltage that was supplied from the outside of the storage apparatus 3 into a DC voltage. The DC voltage output from the power supply module 51 is converted into a lower voltage as needed and supplied to the respective components in the expansion enclosure 11. Incidentally, the power supply module 51 is made redundant in order to improve the availability.

(1-2) Power Consumption Estimation Function

The power consumption estimation function of this embodiment that is loaded in the storage apparatus 3 is now explained. In the case of this embodiment, the storage apparatus 3 is loaded with a power consumption estimation function for estimating the power consumption increase caused by the external access to the physical drives 50 mounted in the storage apparatus 3 based on the operational information concerning the seek distance and data transfer amount that are internally recorded in the respective physical drives 50.

Figure 2:
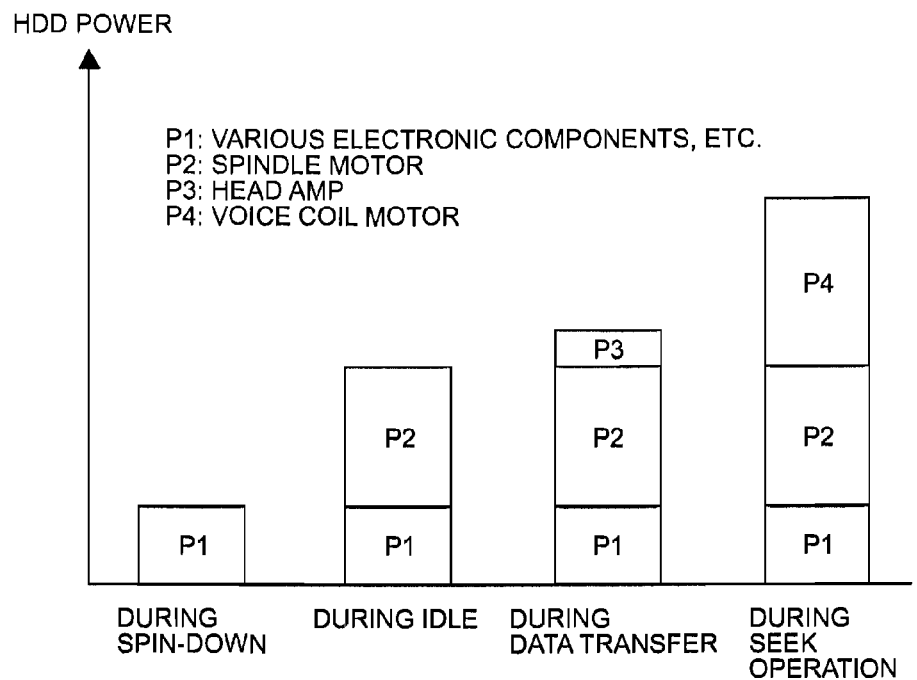
[FIG. 2] A graph explaining the power consumption in the respective operation modes of the hard disk drive.

Here, FIG. 2 shows the outline of the power consumption of a standard hard disk drive in the respective operation modes. The power consumption during the idle state with no external access is constant, and this power consumption includes the power consumption P2 of a spindle motor for rotating the disk, and the power consumption P1 of various electronic components. An idle state is a state where the power of the hard disk drive has been turned on, the disk is rotating at a predetermined rate (for instance, 15,000 rotations per minute) and an access request from the drive controller 22 can be received, but a state where an access is not currently being received (state where processing is not being performed in response to the access request).

The power consumption of a spin-down state in which the disk is suspended includes only the power consumption P1 of various electronic components, and is low in comparison to the power consumption of the idle state. As the primary cause that the power consumption of the hard disk drive increases due to an external access, considered may be the power consumption P4 in an actuator (voice coil motor; hereinafter referred to as the "VCM") for moving a head in the seek direction during the seek operation, and the power consumption P3 in a head amp for amplifying the signal that is sent and received during a data transfer.

Here, since the head moves at a given speed during the seek operation while the VCM is operating, the time that the VCM operated within a predetermined time (VCM operating ratio) will be of a proportional relation with the distance that the head moved within a predetermined time (seek distance). Moreover, since the time that the head amp is operating will be equal to the time that the data is being transferred, the time that the head amp is operating within a predetermined time (head amp operating ratio) will be of a proportional relation with the amount of data that is transferred within a predetermined time (data transfer amount).

Thus, as a result of using the operational information concerning the seek distance and data transfer amount that is internally recorded and retained in the hard disk drive, it will be possible to estimate the increase in the power consumption (this is hereinafter simply referred to as the "additional power") of the hard disk drive caused by the external access, and, by adding the normally consumed power (this is hereinafter referred to as the "normal power consumption") to the additional power, the power consumption in the hard disk drive can be estimated.

Thus, in this embodiment, for each type of physical drive 50 that is mounted in the storage apparatus 3, the power consumption during spin-down, the power consumption during idle, and the power consumption during seek operation and data transfer (these are hereinafter collectively referred to as the "power consumption basic data"), and the maximum seek distance and maximum data transfer amount within a predetermined time frame (these are hereinafter collectively referred to as the "HDD operation basic data") are obtained in advance. Subsequently, the seek distance and data transfer amount that occurred within a predetermined time in the respective physical drives 50 are collected, and the additional power caused by the external access to the respective physical drives 50 is estimated based on the collection result and the power consumption basic data and the HDD operation basic data. Moreover, as a result of adding, for each physical drive 50, the normal power consumption according to the operational state of that physical drive 50 to the additional power caused by the external access, the power consumption of each physical drive 50 is estimated.

Figure 3:
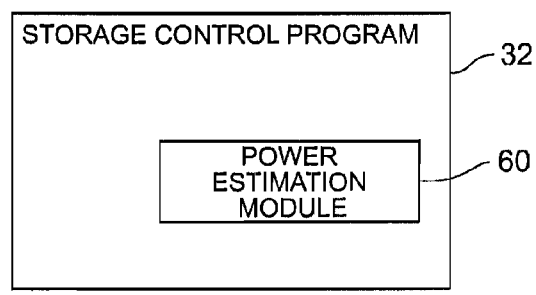
[FIG. 3] A conceptual diagram showing the configuration of the storage control program according to the first embodiment.
Figures 4, 5:
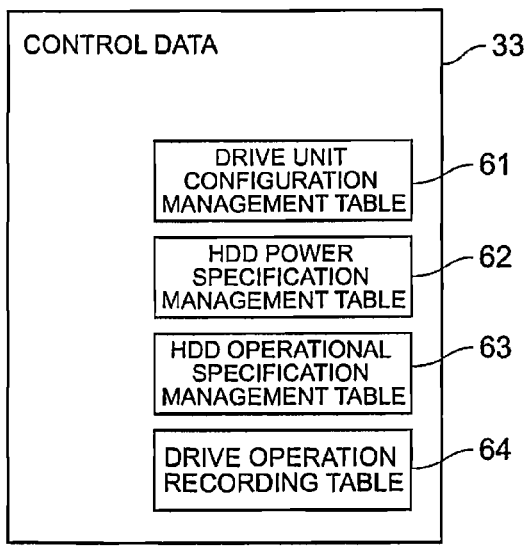
[FIG. 4] A conceptual diagram explaining the storage control data according to the first embodiment.
[FIG. 5] A conceptual diagram explaining the drive unit configuration management table according to the first embodiment.

As means for realizing this kind of power estimation function according to this embodiment, as shown in FIG. 3 and FIG. 4, the controller 23 comprises a power estimation module 60 as a part of the storage control program 32, and comprises a drive unit configuration management table 61, an HDD power specification management table 62, an HDD operational specification management table 63 and a drive operation recording table 64 as a part of the control data 33.

The power estimation module 60 is a program module including a function for estimating the additional power caused by the external access to the respective physical drives 50 based on the operational information concerning the seek distance and data transfer amount collected from the respective physical drives 50, and sending the estimation result together with the normal power consumption to the management terminal 4. In the ensuing explanation, and the processing subject of the various types of processing is explained as a program such as the "power estimation module" and the like, it goes without saying that, in reality, the processor 30 (FIG. 1) of the storage apparatus 3 or the processor of the management terminal 4 executes the processing based on the program.

The drive unit configuration management table 61 is a table for recording the type and mount position of the physical drives 50 mounted in the storage apparatus 3 and, as shown in FIG. 5, is configured from a drive number column 61A, a drive model number column 61B, a usage state column 61C and a power status column 61D.

The drive number column 61A stores the slot number of each slot that is connected to the physical drive 50, and the drive model number column 61B stores the model number of the physical drive 50 that is connected to the slot of the corresponding drive number. The usage state column 61C stores the usage state ("in use" or "spare") of the physical drives 50, and the power status column 61D stores the power status ("spin-up" or "spin-down") of the physical drive 50.

The drive unit configuration management table 61 is updated each time a physical drive 50 is added or removed, or when the usage state of a physical drive 50 is switched, or when the spin-up or spin-down of a physical drive 50 is executed. The power estimation module 60 refers to the drive unit configuration management table 61 upon estimating the power.

The HDD power specification management table 62 is a table for retaining information concerning the power consumption in the various states for each type of physical drive 50 (hard disk drive in this example) that is mounted in the storage apparatus 3 and, as shown in FIG. 6, is configured from a drive model number column 62A, a spin-down power column 62B, an idle power column 62C, a seek operation additional power column 62D and a data transfer additional power column 62E.

The drive model number column 62A stores the model number of each physical drive 50 that could be mounted in the storage apparatus 3. The information stored in the drive model number column 62A may be information other than the model number of the physical drive 50 so as long as it is an identifier that is able to identify the respective physical drives 50 having different specifications concerning power.

The spin-down power column 62B stores the power consumption when the corresponding physical drive 50 is in a spin-down state, and the idle power column 62C stores the power consumption when the corresponding physical drive 50 is in an idle state.

The seek operation additional power column 62D stores the differential between the power consumption during seek operation and the power consumption during idle in the corresponding physical drive 50, and the data transfer additional power column 62E stores the differential between the power consumption during the data transfer and the power consumption in the idle state of the corresponding physical drive 50.

The HDD power specification management table 62 is created in advance based on numerical values that are obtained from measurement or specification information that is announced by the manufacturer of the physical drive 50, and updated each time a physical drive 50 of a new model number is added. The power estimation module 60 refers to the HDD power specification management table 62 upon estimating the power.

The HDD operational specification management table 63 is a table for retaining the maximum seek distance (this is hereinafter referred to as the "maximum seek distance") and the maximum data transfer amount (this is hereinafter referred to as the "maximum data transfer amount") for each type of physical drive 50 that is mounted in the storage apparatus 3. Incidentally, the maximum seek distance and the maximum data transfer amount are the maximum values of the seek distance and data transfer amount during the period that the power estimation module 60 starts the power estimation processing (FIG. 9) described later and until it executes the subsequent power estimation processing. The HDD operational specification management table 63, as shown in FIG. 7, is configured from a drive model number column 63A, a maximum seek distance column 63B and a maximum data transfer amount column 63C.

The drive model number column 63A stores the model number of each physical drive 50 that is mounted in the storage apparatus 3, and the maximum seek distance column 63B stores the maximum seek distance during the period that the power estimation module 60 starts the power estimation processing and until it executes the subsequent power estimation processing. The maximum data transfer amount column [63C] stores the maximum data transfer amount during the period that the power estimation module 60 starts the power estimation processing and until it executes the subsequent power estimation processing.

The HDD operational specification management table 63 is created in advance based on numerical values that are obtained from measurement, and updated each time a physical drive 50 of a new model number is added. The power estimation module 60 refers to the HDD operational specification management table 63 upon estimating the power.

The drive operation recording table 64 is a table for recording how much the seek operation and data transfer respectively occurred in the physical drive 50 during the period that the power estimation processing described later was started until the subsequent power consumption estimation processing is started and, as show in FIG. 8, is configured from a drive number column 64A, a counter name column 64B, a previous counter value column 64C and a counter value increase column 64D.

The drive number column 64A stores the drive number explained with reference to FIG. 5. The counter name column 64B stores the name (this is hereinafter referred to as the "counter name") for identifying the contents of the individual pieces of operational information concerning the seek distance and data transfer amount in the respective physical drives 50. There are the following counter names; namely, "Seeks is greater than or equal to $2/3$" corresponding to the number of times that the seek operation was performed in which the seek distance was $2/3$ or more of the disk radius, "Seeks is greater than or equal to $1/3$ and less than $2/3$" corresponding to the number of times that the seek operation was performed in which the seek distance was $1/3$ or more and less than $2/3$ of the disk radius, "Seeks is greater than or equal to $1/6$ and less than $1/3$" corresponding to the number of times that the seek operation was performed in which the seek distance was $1/6$ or more and less than $1/3$ of the disk radius, "Seeks is greater than or equal to $1/12$ and less than $1/6$" corresponding to the number of times that the seek operation was performed in which the seek distance was $1/12$ or more and less than $1/6$ of the disk radius, "Seeks is greater than 0 and less than $1/12$" corresponding to the number of times that the seek operation was performed in which the seek distance was more than 0 and less than $1/12$ of the disk radius, "total read bytes" corresponding to the data amount of the read data that was transferred to the drive controller 22, and "total write bytes" corresponding to the data amount of the write data that was transferred from the drive controller 22.

The previous counter value column 64C stores the counter value of the corresponding seek distance or data transfer amount acquired from the respective physical drives 50 during the previous power estimation processing, and the counter value increase column 64D stores the differential between the corresponding counter value acquired during the power estimation processing before last and the counter value acquired during the previous power estimation processing.

The drive operation recording table 64 is updated when the power estimation module 60 executes the power estimation processing as described later. The power estimation module 60 refers to the drive operation recording table 64 upon estimating the power.

Figure 9:
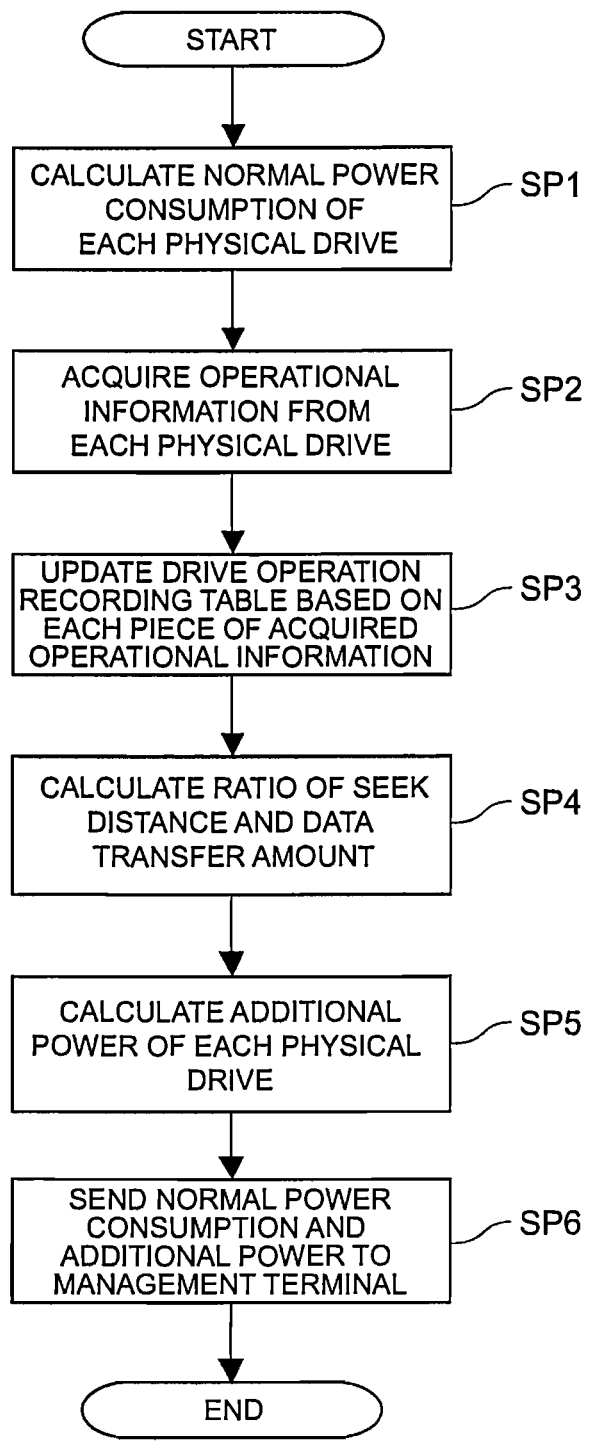
[FIG. 9] A flowchart showing the processing routine of the power estimation processing according to the first embodiment.

FIG. 9 shows the processing routine of the power estimation processing to be executed by the power estimation module 60 (FIG. 3). The power estimation module 60 estimates the power that is being consumed by the respective physical drives 50 of the storage apparatus 3 based on the various types of information stored in the drive operation recording table 64, and sends the estimation result to the management terminal 4. The power estimation module 60 is started up by the storage control program 32 (FIG. 3) in predetermined time intervals (for example, every minute), and executes the power estimation processing shown in FIG. 9.

Specifically, when the power estimation module 60 is started up by the storage control program 32, it foremost refers to the drive unit configuration management table 61 (FIG. 4) and the HDD power specification management table 62 (FIG. 4), and acquires the normal power consumption "P_Static" of the respective physical drives 50 (SP1).

Specifically, the power estimation module 60 reads the drive model number and the power status for each entry of the drive unit configuration management table 61, refers to the corresponding entry of the HDD power specification management table 62 from the read drive model number, and sets the value stored in the idle power column 62C (FIG. 6) as the normal power consumption "P_Static" if the power status of the physical drive 50 at such time is a spin-up state, and sets the value stored in the spin-down power column 62B (FIG. 6) as the normal power consumption "P_Static" if the power status of the physical drive 50 at such time is a spin-down state.

Subsequently, the power estimation module 60 acquires the operational information that is internally recorded and retained in the respective physical drives 50 (SP2). Specifically, the power estimation module 60 reads the usage state and power status, respectively, for each entry of the drive unit configuration management table 61 and issues a Log Sense command to the respective physical drives 50 in which the usage state is "in use" and the power status is "spin-up" in order to acquire the number of seek operations (count value) in which the seek distance is $2/3$ or more of the disk radius, the number of seek operations (count value) in which the seek distance is $1/3$ or more and less than $2/3$ of the disk radius, the number of seek operations (count value) in which the seek distance is $1/6$ or more and less than $1/3$ of the disk radius, the number of seek operations (count value) in which the seek distance is $1/12$ or more and less than $1/6$ of the disk radius, and the number of seek operations (count value) in which the seek distance is more than 0 and less than $1/12$ of the disk radius, and the foregoing read data total transfer amount and write data total transfer amount (FIG. 8) which are internally recorded and retained in the physical drives 50. The power estimation module 60 does not issue a Log Sense command to the respective physical drives 50 in which the usage state is "spare" or the power status is "spin-down."

Subsequently, the power estimation module 60 updates the drive operation recording table 64 based on the acquired operational information of the respective physical drives 50 (SP3). Specifically, the power estimation module 60 calculates the differential between the respective counter values acquired based on the processing of step SP2, and the counter value stored in the corresponding previous counter value column 64C (FIG. 8) of the drive operation recording table 64, and records the respective calculation results in the corresponding counter value increase column 64D (FIG. 8) of the drive operation recording table 64. The power estimation module 60 also stores the respective counter values acquired at step SP2 in the corresponding previous counter value column 64C of the drive operation recording table 64.

Subsequently, the power estimation module 60 refers to the drive operation recording table 64 and calculates, for each physical drive 50, the ratio of the total value of the seek distance (this is hereinafter referred to as the "total seek distance") of the physical drive 50 to the maximum seek distance and the ratio of the total value of the data transfer amount (this is hereinafter referred to as the "total data transfer amount") of the physical drive 50 to the maximum data transfer amount (SP4).

Specifically, the power estimation module 60 calculates "R_Seek" according to the following formula with the ratio of the total seek distance of the physical drive 50 to the maximum seek distance as "R_Seek."

[Math.1]

$$R\_Seek=(\tfrac{5}{6}\times C\_Seek1+\tfrac{1}{2}\times C\_Seek2+\tfrac{1}{4}\times C\_Seek3+\tfrac{1}{8}\times C\_Seek4+\tfrac{1}{24}\times C\_Seek5)/Max\_Seek \qquad (1)$$

In Formula (1), "C_Seek1" is the count value of the seek operation in which the seek distance is 2/3 or more of the disk radius in the physical drive 50, "C_Seek2" is the count value of the seek operation in which the seek distance is 1/3 or more and less than 2/3 of the disk radius in the physical drive 50, "C_Seek3" is the count value of the seek operation in which the seek distance is 1/6 or more and less than 1/3 of the disk radius in the physical drive 50, "C_Seek4" is the count value of the seek operation in which the seek distance is 1/12 or more and less than 1/6 of the disk radius in the physical drive 50, "C_Seek5" is the count value of the seek operation in which the seek distance is more than 0 and less than 1/12 of the disk radius in the physical drive 50, and "Max_Seek" is the maximum seek distance in the physical drive 50.

The power estimation module 60 additionally calculates "R_Xfer" according to the following formula with the ratio of the total data transfer amount of the physical drive 50 to the maximum data transfer amount as "R_Xfer."

[Math.2]

$$R\_Xfer=(C\_Read+C\_Write)/Max\_Xfer \qquad (2)$$

In Formula (2), "C_Read" is the total data transfer amount of the read data in the physical drive 50, "C_Write" is the total data transfer amount of the write data in the physical drive 50, and "Max_Xfer" is the maximum data transfer amount in the physical drive 50.

Subsequently, the power estimation module 60 respectively calculates, for each physical drive 50, the additional power "P_Seek" caused by the seek operation and the additional power "P_Xfer" caused by the data transfer operation in the execution interval of the power estimation processing based on the HDD power specification management table 62 and the value of "R_Seek" and the value of "R_Xfer" for each physical drive 50 obtained at step SP4.

Specifically, the power estimation module 60 calculates the additional power "P_Seek" caused by the seek operation in the execution interval of the power estimation processing according to the following formula:

[Math.3]

$$P\_Seek=R\_Seek\times p\_Seek \qquad (3),$$

and calculates the additional power "P_Xfer" caused by the data transfer operation in the execution interval of the power estimation processing according to the following formula:

[Math.4]

$$P\_Xfer=R\_Xfer\times p\_Xfer \qquad (4).$$

For example, if the seek distance ratio "R_Seek" is 1/10, and the additional power "p_Seek" caused by the seek operation of the physical drive 50 registered in the HDD power specification management table 62 is 4.9 W, their multiplication result of 0.49 W is calculated as the additional power "P_Seek" caused by the seek operation in the execution interval of the power estimation processing. Moreover, if the data transfer amount ratio "R_Xfer" is 1/10, and the additional power "p_Xfer" caused by the data transfer of the physical drive 50 registered in the HDD power specification management table 62 is 1.9 W, their multiplication result of 0.19 W is calculated as the additional power "P_Xfer" caused by the data transfer operation in the execution interval of the power estimation processing.

In addition, based on the operation result of Formula (3) and Formula (4), the power estimation module 60 calculates the total additional power (this is hereinafter referred to as the "total additional power") "P_Dynamic" caused by the external access to the physical drive 50 according to the following formula.

[Math.5]

$$P\_Dynamic\times P\_Seek+P\_Xfer \qquad (5)$$

Accordingly, in the foregoing example, since the additional power "P_Seek" caused by the seek operation is 0.49 W and the additional power "P_Xfer" caused by the data transfer is 0.19 W, the total additional power "P_Dynamic" in that physical drive 50 is calculated as 0.68 (equals 0.49 added to 0.19) W as a result of adding 0.49 W as the additional power caused by the seek operation and 0.19 W as the additional power caused by the data transfer operation. As a result of executing the foregoing processing to all physical drives 50, the power estimation module 60 obtains the additional power "P_Dynamic" caused by the external access to the respective physical drives 50.

Subsequently, the power estimation module 60 sends to the management terminal 4, as the power consumption information, the normal power consumption "P_Static" of each physical drive 50 acquired at step SP1, and the additional power "P_Seek" caused by the seek operation, the additional power "P_Xfer" caused by the data transfer operation, and the total additional power "P_Dynamic" caused by the external access to each physical drive 50 calculated at step SP5 (SP6), and thereafter ends this power estimation processing.

Figures 10, 11:
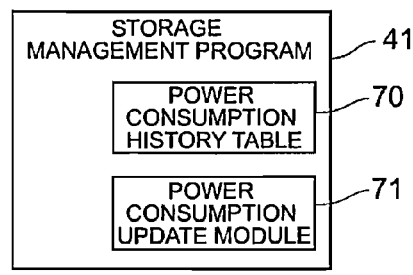
[FIG. 10] A conceptual diagram explaining the power consumption information according to the first embodiment.
[FIG. 11] A conceptual diagram explaining the storage management program according to the first embodiment.

The specific contents of the power consumption information to be sent from the power estimation module 60 to the management terminal 4 at step SP6 of the power estimation processing are shown in FIG. 10. As evident from FIG. 10, the power consumption information D1 includes the average power consumption, the additional power "P_Seek" caused by the seek operation, the additional power "P_Xfer" caused by the data transfer, and the normal power consumption "P_Static" of each physical drive 50 during the period that the previous power consumption information D1 was sent until the current power consumption information D1 is sent. The average power consumption is obtained by adding the additional power "P_Seek" caused by the seek operation, the additional power "P_Xfer" caused by the data transfer, and the normal power consumption "P_Static."

The power consumption information D1 includes, in addition to the foregoing information, the average power consumption (average power loss caused by AC-DC conversion) in the power supply module 51 (FIG. 1) existing in the expansion enclosure 11 (FIG. 1). However, the average power consumption in the power supply module 51 (FIG. 1) is a fixed value (for instance, 28 W) that is obtained in advance.

The power consumption information D1 also includes the power of the overall expansion enclosure 11. The power of the expansion enclosure 11 is the sum of the average power consumption of the respective physical drives 50 and the respective power supply modules 51.

FIG. 11 shows the schematic configuration of the storage management program 41 (refer to FIG. 1) loaded in the management terminal 4. The storage management program 41 comprises, as a part thereof, a power consumption history table 70 and a power consumption update module 71.

Figures 12, 13:
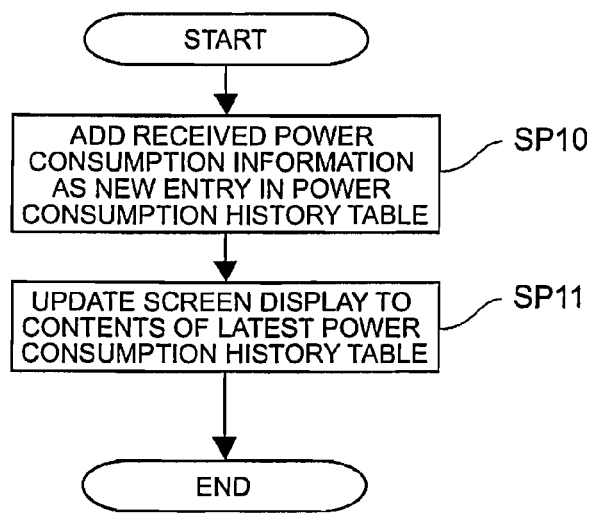
[FIG. 12] A conceptual diagram explaining the power consumption history table according to the first embodiment.
[FIG. 13] A flowchart showing the processing routine of the power consumption update processing according to the first embodiment.

The power consumption history table 70 is a table that is used for retaining various types of information contained in the power consumption information D1 (FIG. 10) sent from the storage apparatus 3 and, as shown in FIG. 12, is configured from a date and time column 70A, a part column 70B, an average power consumption column 70C, a seek operation additional power column 70D, a data transfer additional power column 70E and a normal power consumption column 70F.

The date and time column 70A stores the date and time that the management terminal 4 acquired the corresponding power consumption information D1. Moreover, the part column 70B, the average power consumption column 70C, the seek operation additional power column 70D, the data transfer additional power column 70E and the normal power consumption column 70F respectively store the corresponding information among the average power consumption, the additional power "P_Seek" caused by the seek operation, the additional power "P_Xfer" caused by the data transfer, and the normal power consumption "P_Static" of each physical drive 50 or each power supply module 51 (FIG. 1) obtained from the power consumption information D1.

Meanwhile, the power consumption update module 71 is a program module including a function for receiving the power consumption information D1 sent from the storage apparatus 3, registering and storing the received power consumption information DI in the power consumption history table 70, and updating the display contents of the management terminal 4 as needed. When the power consumption update module D1 receives the power consumption information D1 sent from the storage apparatus 3, it executes the processing shown in FIG. 13 according to its processing routine.

Specifically, when the power consumption update module 71 receives the power consumption information D1 sent from the storage apparatus 3, it starts the power consumption update processing shown in FIG. 13, and foremost adds and registers the contents of the received power consumption information D1 as a new entry of the power consumption history table 70 (SP10).

Subsequently, if the management terminal 4 is displaying the contents of the power consumption history table 70 via the Web browser, the power consumption update module 71 updates the contents of the displayed power consumption history table 70 to the contents of the latest power consumption history table 70 (SP11), and thereafter ends this power consumption update processing.

(1-3) Effect of This Embodiment

According to the computer system 1 of this embodiment, the power consumption of the respective physical drives 50 mounted in the storage apparatus 3 can be estimated accurately without having to use a wattmeter. Consequently, it is possible to realize a computer system that is capable of easily and accurately estimating the power consumption of the physical drives 50 mounted in the storage apparatus 3 based on the operational status of the physical drives 50.

(2) Second Embodiment

Figure 14:
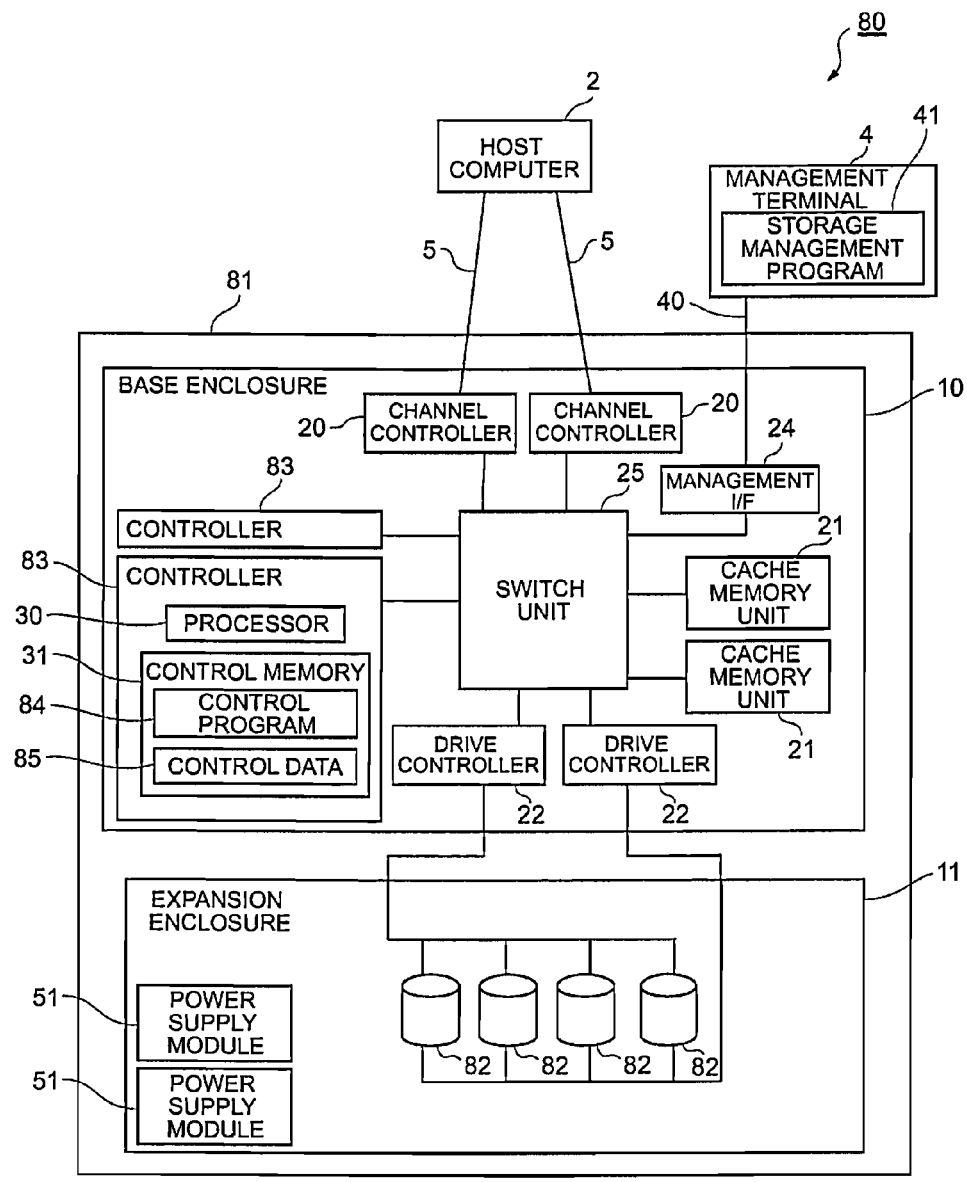
[FIG. 14] A block diagram showing the overall configuration of the computer system according to the second embodiment.

FIG. 14 having the same reference numerals for the components corresponding to those shown in FIG. 1 shows the computer system 80 according to the second embodiment. The computer system 80 is configured similar to the computer system 1 of the first embodiment other than that the power consumption estimation function loaded in the storage apparatus 81 differs from the power consumption estimation function loaded in the storage apparatus 3 of the first embodiment.

Specifically, in the case of this embodiment, the power consumption during the spin-down state and the power consumption during the idle state, and the power consumption upon performing the VCM operation based on the seek operation and the head amp operation based on data transfer to the utmost limit (these are hereinafter referred to as the "power consumption basic data") are obtained in advance for each type of physical drive 82, and the power consumption according to the operational status of each physical drive 82 is obtained based on the foregoing power consumption basic data and the respective operating times of the VCM and head amp in each physical drive 50.

Figure 15:
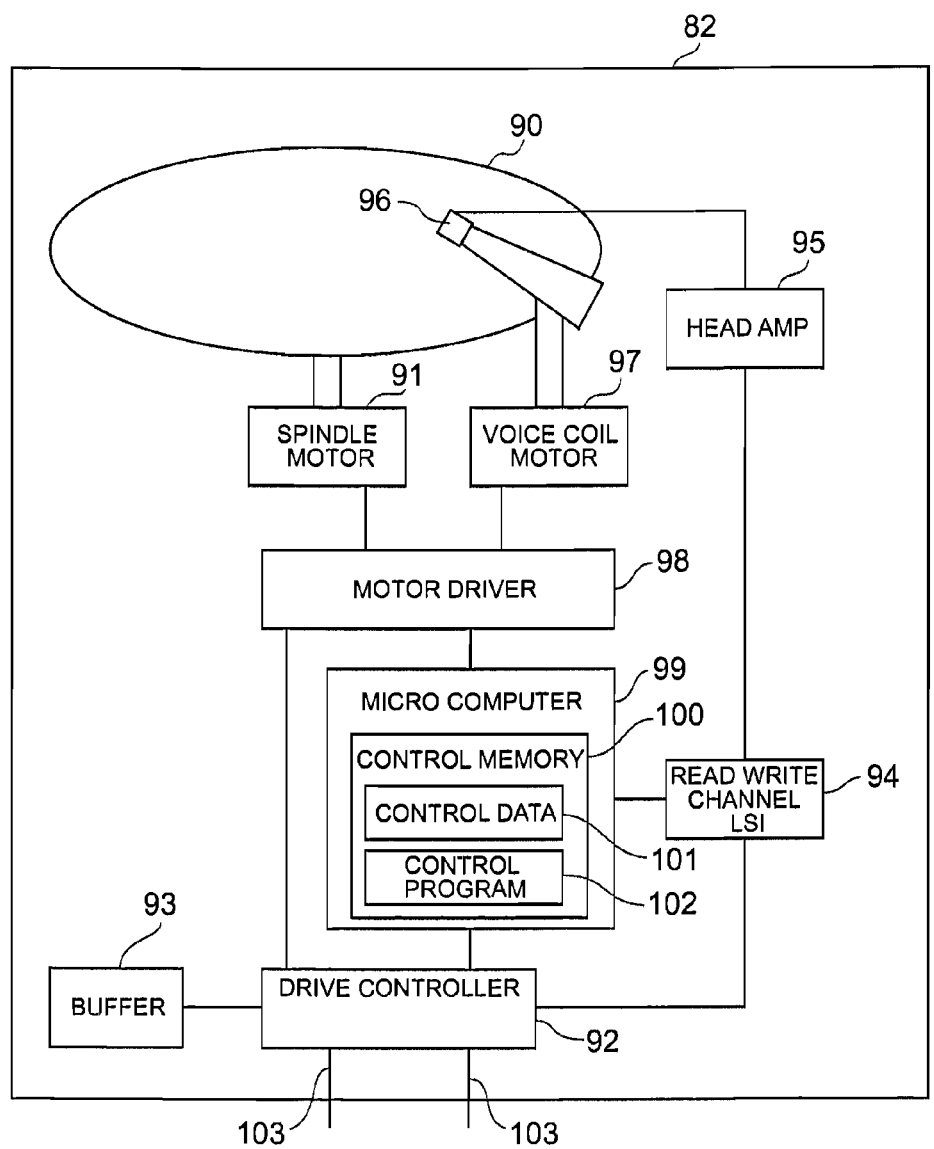
[FIG. 15] A block diagram showing the schematic configuration of the hard disk drive according to the second embodiment.

FIG. 15 shows the internal configuration of the physical drive 82 that is configured from a hard disk drive. The physical drive 82 is primarily configured from a disk 90, a spindle motor 91, a drive controller 92, a buffer 93, a read/write channel LSI (Large Scale Integration) 94, a head amp 95, a head 96, a VCM 97, a motor driver 98 and a micro computer 99.

The disk 90 is a magnetic recording medium configured from an aluminum alloy or glass disk to which a magnetic material is applied or deposited, and is rotated by the spindle motor 91. The drive controller 92 receives a command from a higher-level device (in this example, the drive controller 22 of the storage apparatus 81) via the drive interface 103 (for example SCSI interface), and controls the interface with various types of components or executes processing for performing error correction.

The buffer 93 is used for temporarily storing the write data sent from the higher-level device or the read data that was read from the disk 90. The read/write channel LSI 94 includes a function for encoding the write data and decoding the data that is output from the head amp 95.

The head amp 95 is used for amplifying the write signal that is output from the read/write channel LSI 94, and amplifying the signal read from the disk 90. The head 96 is used for reading and writing data in and from the disk 90. The head 96 is moved by the VCM 97 to a position above the disk 90 as commanded by the micro computer 99 upon reading and writing data in and from the disk 90.

The motor driver 98 is configured from a spindle motor driver and a VCM driver (not shown), and drives the spindle motor 91 and the VCM 97, respectively. The VCM driver controls the drive start and drive end of the VCM 97 according to commands from the micro computer 99.

The micro computer 99 is a processor for governing the operational control of the overall physical drive 82. The control memory 100 of the micro computer 99 stores drive control data 101 and a drive control program 102 for controlling the operation of the physical drive 82, and various types of control concerning the overall physical drive 82 is performed based on the drive control data 101 and the drive control program 102. The micro computer 99 also comprises a timer not shown, and is able to acquire the current time from the timer.

Figures 16, 17:
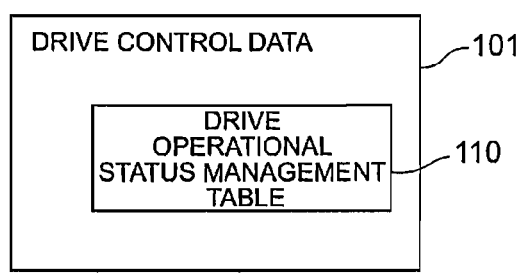
[FIG. 16] A conceptual diagram explaining the drive control data.
[FIG. 17] A conceptual diagram explaining the drive operational status management table.

The drive control data 101, as shown in FIG. 16, comprises a drive operational status management table 110. The drive operational status management table 110 is a table for recording and retaining the operational information of the self-physical drive 82 and, as shown in FIG. 17, is configured from a VCM operation start time column 110A, a head amp operation start time column 110B, a VCM cumulative operating time column 110C and a head amp cumulative operating time column 110D.

The VCM operation start time column 110A stores the time that the drive of the VCM 97 was started (this is hereinafter referred to as the "VCM operation start time"), which is represented as the time that has elapsed from the time that the physical drive 82 was started up. The head amp operation start time column 110B stores the time that the drive of the head amp 95 was started (this is hereinafter referred to as the "head amp operation start time"), which is represented as the time that has elapsed from the time that the physical drive 82 was started up.

The VCM cumulative operating time column 110C stores the cumulative time that the VCM 97 was operated (this is hereinafter referred to as the "VCM cumulative operating time"), and the head amp cumulative operating time column 110D stores the cumulative time that the head amp 95 was operated (this is hereinafter referred to as the "head amp cumulative operating time"). The foregoing operational information can be collected from the respective physical drives 82 by using the operating time acquisition command, which is a dedicated command.

If there is no access from the host computer 2 to the physical drive 82 for a given period of time, in order to ensure the reliability of the recorded data, an internal program of the physical drive 82 unit verifies the recorded data periodically. Since the VCM and head amp are also operated in the verification process, it is reflected in the foregoing operational information.

Figure 18:
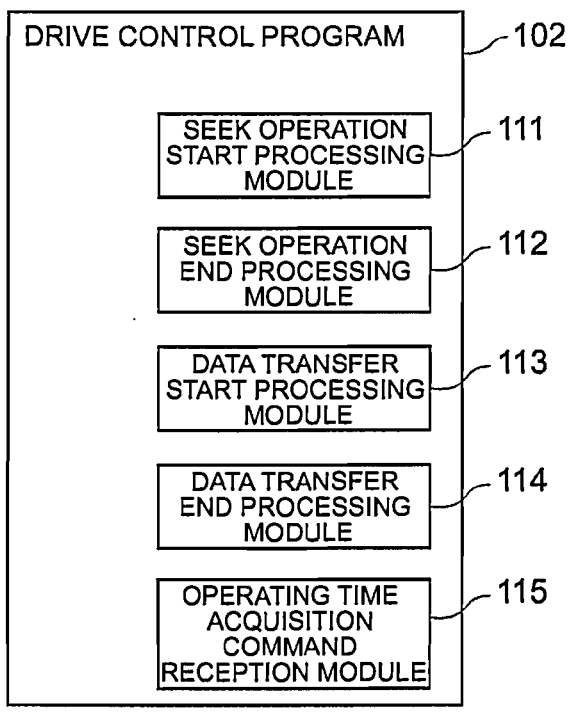
[FIG. 18] A conceptual diagram explaining the drive control program.

Meanwhile, the drive control program 102, as shown in FIG. 18, is configured from a seek operation start processing module 111, a seek operation end processing module 112, a data transfer start processing module 113, a data transfer end processing module 114 and an operating time acquisition command reception module 115.

The seek operation start processing module 111 is a program module for executing various types of processing upon starting the seek operation, and is started up by the drive control program 102 when such drive control program 102 is to move the head 96 to a predetermined position on the disk 90 based on a command from the micro computer 99.

Figure 19:
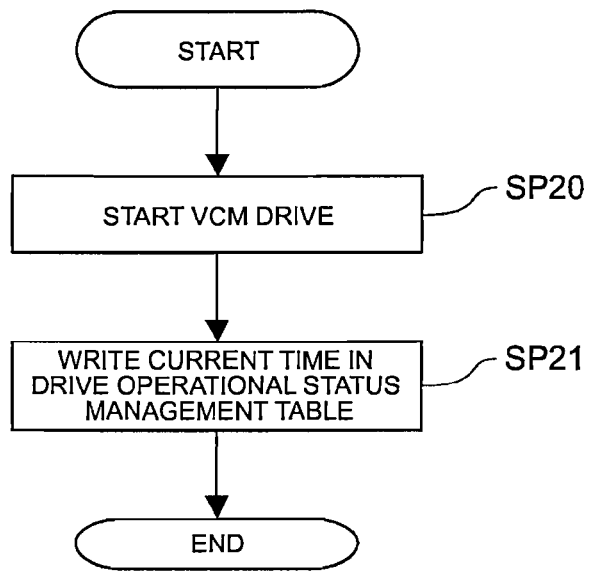
[FIG. 19] A flowchart showing the processing routine of the seek operation start processing.

When the seek operation start processing module 111 is started up by the drive control program 102, according to the processing routine shown in FIG. 19, it foremost starts the drive of the VCM 97 by controlling the motor driver 98 (SP20). Subsequently, the seek operation start processing module 111 updates the VCM operation start time stored in the VCM operation start time column 110A (FIG. 17) of the drive operational status management table 110 to the current time (SP21).

The seek operation end processing module 112 is a program module for executing various types of processing upon ending the seek operation, and is started up by the drive control program 102 when the head 96 is to be suspended at a predetermined location above the disk 90 based on a command from the micro computer 99.

Figure 20:
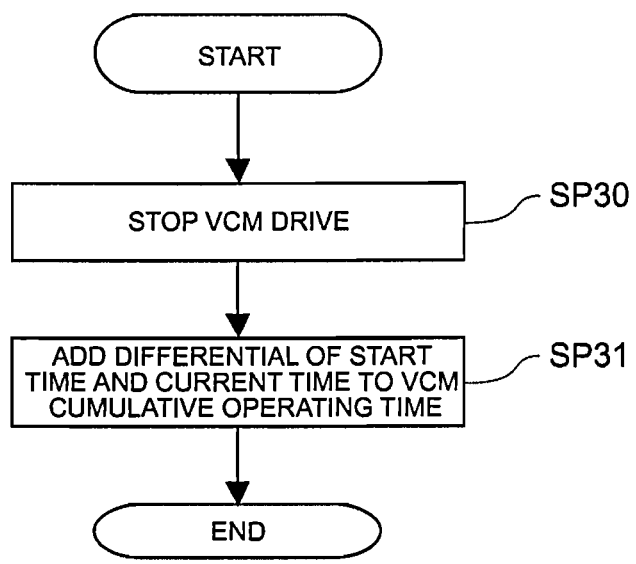
[FIG. 20] A flowchart showing the processing routine of the seek operation end processing.

When the seek operation end processing module 112 is started up by the drive control program 102, according to the processing routine shown in FIG. 20, it foremost stops the drive of the VCM 97 by controlling the motor driver 98 (SP30). Subsequently, the seek operation end processing module 112 calculates the differential between the VCM operation start time stored in the VCM operation start time column 110A (FIG. 17) of the drive operational status management table 110 and the current time (that is, the operating time of the VCM 97 at such time), and updates the VCM cumulative operating time stored in the VCM cumulative operating time column 110C to the value obtained by adding the differential between the VCM operation start time and the current time to the VCM cumulative operating time (SP31).

The data transfer start processing module 113 is a program module for executing various types of processing upon starting the data transfer, and is started up by the drive control program 102 upon starting the data transfer between the buffer 93 and the disk 90 based on a command from the micro computer 99.

Figure 21:
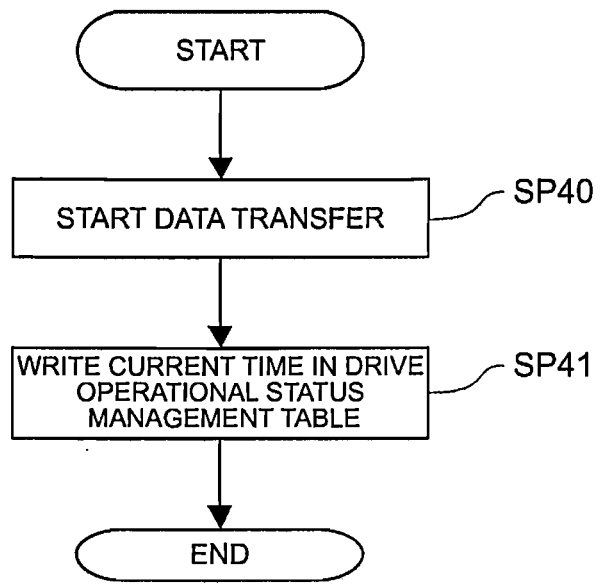
[FIG. 21] A flowchart showing the processing routine of the data transfer start processing.

When the data transfer start processing module 113 is started up by the drive control program 102, according to the processing routine shown in FIG. 21, it foremost controls the drive controller 92 (FIG. 15) and starts sending the data of the buffer to the read/write channel LSI 94 if it is a data write [command], and stores the read data sent from the head 96 via the read/write channel LSI 94 in the buffer 93 if it is a data read [command] (SP40). Subsequently, the data transfer start processing module 113 updates the head amp operation start time stored in the head amp operation start time column 110B of the drive operational status management table 110 to the current time (SP41).

The data transfer end processing module 114 is a program module for executing various types of processing upon ending the data transfer, and is started up by the drive control program 102 upon ending the data transfer between the buffer 93 and the disk 90.

Figure 22:
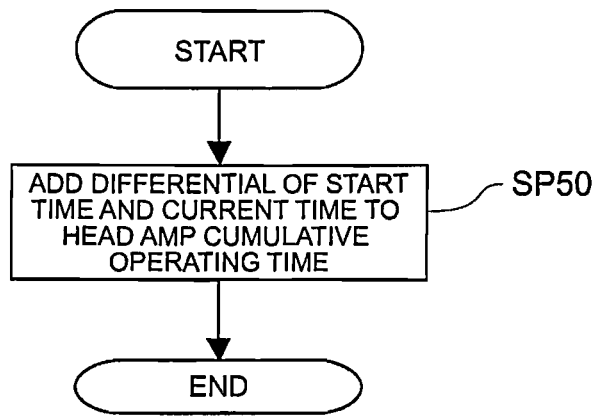
[FIG. 22] A flowchart showing the processing routine of the data transfer end processing.

When the data transfer end processing module 114 is started up by the drive control program 102, according to the processing routine shown in FIG. 22, it calculates the differential between the head amp operation start time stored in the head amp operation start time column 110B of the drive operational status management table 110 and the current time (that is, the time elapsed for the data transfer at such time), and updates the head amp cumulative operating time stored in the head amp cumulative operating time column 110D to the value obtained by adding the differential between the head amp operation start time and the current time to the head amp cumulative operating time (SP50).

The operating time acquisition command reception module 115 is a program module for executing various types of processing upon receiving an operating time acquisition command, which is a dedicated command sent from the outside, and is started by the drive control program 102 upon receiving the operating time acquisition command.

Figure 23:
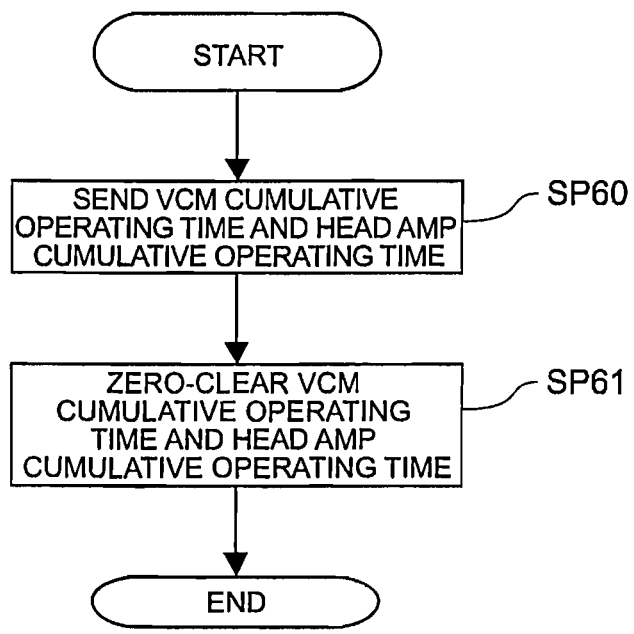
[FIG. 23] A flowchart showing the processing routine of the operating time acquisition command reception processing.

When the operating time acquisition command reception module 115 is started up by the drive control program 102, according to the processing routine shown in FIG. 23, it foremost reads the VCM cumulative operating time and the head amp cumulative operating time respectively stored in the VCM cumulative operating time column 110C and the head amp cumulative operating time column 110D of the drive operational status management table 110 (FIG. 17), and controls the drive controller 92 to send them to the sender of the operating time acquisition command (SP60). Subsequently, the operating time acquisition command reception module 115 clears the VCM cumulative operating time and the head amp cumulative operating time in the drive operational status management table 110 to "0," respectively (SP61).

Figure 24:
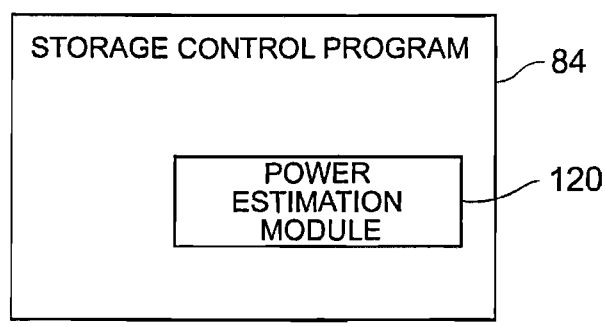
[FIG. 24] A conceptual diagram showing the configuration of the storage control program according to the second embodiment.

Meanwhile, FIG. 24 shows the configuration of the storage control program 84 of the second embodiment stored in the control memory 31 of the controller 83 provided in the base enclosure 10 of the storage apparatus 81 (FIG. 14), and FIG.

25 shows the configuration of the storage control data 85 of the second embodiment stored in the control memory 31.

The storage control program 84, as evident from FIG. 24, comprises a power estimation module 120. The power estimation module 120 is a program module including a function of estimating the power consumption increase caused by the external access to the respective physical drives 82 based on the operational information of the VCM 97 and the head amp 95 collected from the respective physical drives 82, and sending the estimation result together with the normal power consumption to the management terminal 4.

The storage control data 85 comprises a drive unit configuration management table 121, an HDD power specification management table 122 and a drive operation recording table 123.

The drive unit configuration management table 121 is a table for recording the type and mount position of the physical drive 82 mounted in the storage apparatus 81, and is configured the same as the drive unit configuration management table 61 of the first embodiment explained above with reference to FIG. 5.

The HDD power specification management table 122 is a table for retaining information concerning the power consumption in the various states for each type of physical drive 82 mounted in the storage apparatus 81 and, as shown in FIG. 26, is configured from a drive model number column 122A, a spin-down power column 122B, an idle power column 122C, a VCM operation additional power column 122D and an head amp operation additional power column 122E.

The drive model number column 122A, the spin-down power column 122B and the idle power column 122C respectively store the same information as the information that is stored in the drive model number column 62A, the spin-down power column 62B and the idle power column 62C of the drive power specification management table 62 according to the first embodiment explained above with reference to FIG. 6. The VCM operation additional power column 122D stores the differential between the power consumption in a state where the VCM 97 is operating based on the seek operation in the corresponding physical drive 82, and the power consumption during an idle state. The head amp operation additional power column 122E stores the differential between the power consumption in a state where the head amp 95 is operating based on the data transfer in the corresponding physical drive 82, and the power consumption during an idle state.

The HDD power specification management table 122 is updated when a new type physical drive 82 is added. The HDD power specification management table 122 is also referred to by the power estimation module 120 upon estimating the power.

The drive operation recording table 123 is a table for recording how much the VCM 97 and the head amp 95 were operated in the physical drive 82 during the period from the start of the power estimation processing described later and until the subsequent power estimation processing is started and, as shown in FIG. 27, is configured from a drive number column 123A, a VCM cumulative operating time column 123B and a head amp cumulative operating time column 123C.

The drive number column 123A stores slot number of the respective slots to which the physical drives 82 are connected. The VCM cumulative operating time column 123B and the head amp cumulative operating time column 123C respectively store the VCM cumulative operating time and the head amp cumulative operating time of the physical drive 82 collected from the corresponding physical drive 82 as described later.

The drive operation recording table 123 is updated each time the power estimation module 120 collects the foregoing information from the respective physical drives 82. The drive operation recording table 123 is referred to by the power estimation module 120 upon estimating the power.

Figure 28:
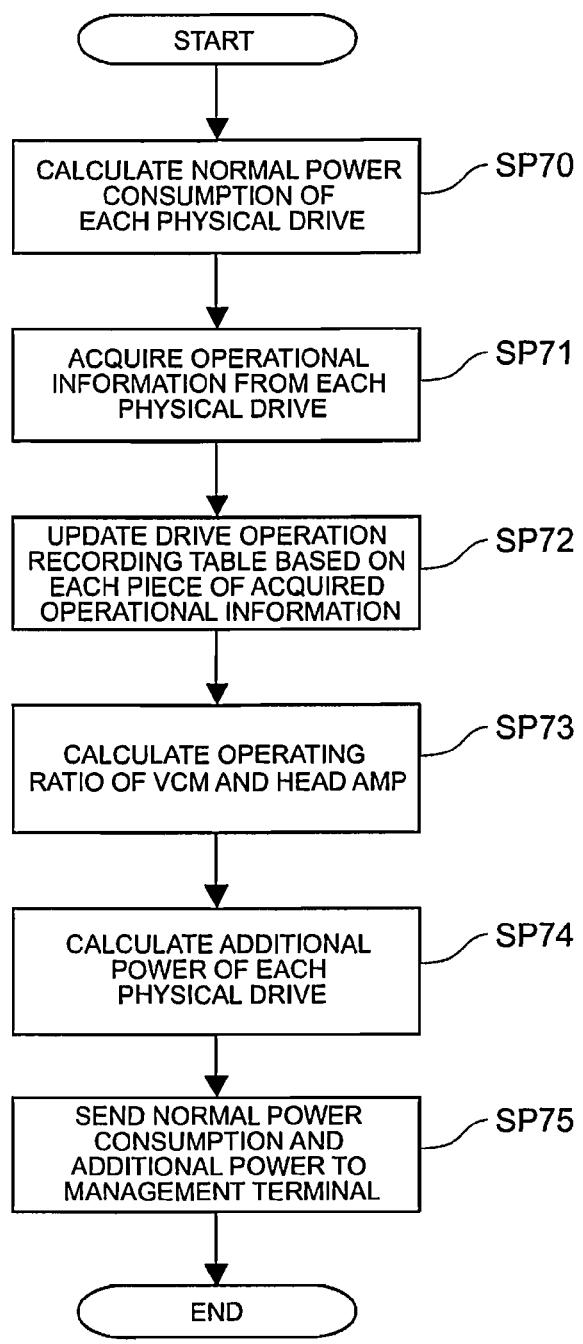
[FIG. 28] A flowchart showing the processing routine of the power estimation processing according to the second embodiment.

FIG. 28 shows the processing routine of the power estimation processing according to the second embodiment to be executed by the power estimation module 120 (FIG. 24). The power estimation module 120 is a program module for estimating the power consumption that is being consumed by the respective physical drives 82 of the storage apparatus 81 based on the various types of information stored in the drive operation recording table 123, and sending the estimation result to the management terminal 4. The power estimation module 120 is started by the storage control program 84 (FIG. 24) in predetermined intervals (for instance, every minute), and executes the power estimation processing shown in FIG. 28.

Figure 25:
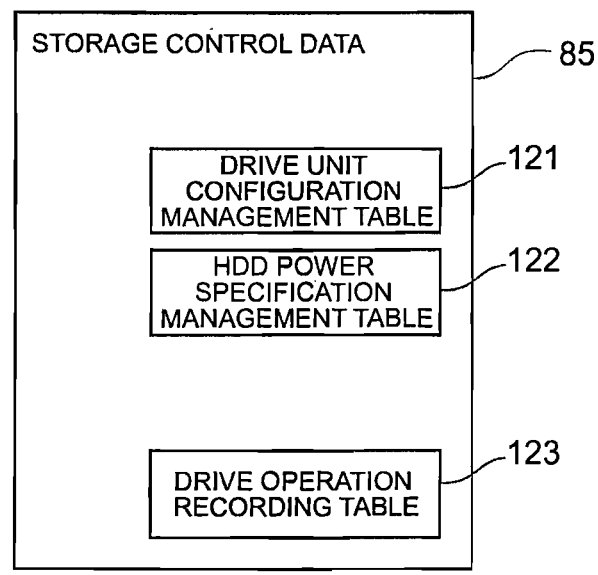
[FIG. 25] A conceptual diagram explaining the storage control data according to the second embodiment.

Specifically, when the power estimation module 120 is started up by the storage control program 84, it foremost refers to the drive unit configuration management table 121 (FIG. 25) and the HDD power specification management table 122 (FIG. 26), and obtains the normal power consumption "P_Static" of the respective physical drives 82 (SP70).

Specifically, the power estimation module 120 reads the drive model number and power status for each entry of the drive unit configuration management table 121, refers to the corresponding entry of the HDD power specification management table 122 from the read drive model number, and sets the value stored in the idle power column 122C as the normal power consumption "P_Static" if the power status of the physical drive 82 at such time is a spin-up state, and sets the value stored in the spin-down power column 122B as the normal power consumption "P_Static" if the power status of the physical drive 82 at such time is a spin-down state.

Subsequently, the power estimation module 120 acquires the operational information that is internally recorded and retained by the respective physical drives 82 (SP71). Specifically, the power estimation module 120 reads the usage state and power status, respectively, for each entry of the drive unit configuration management table 121 and issues an operating time acquisition command to the respective physical drives 82 in which the usage state is "in use" and the power status is "spin-up" and acquires the VCM cumulative operating time and the head amp cumulative operating time (refer to FIG. 17) that are internally recorded and retained by the physical drives 82. The power estimation module 120 does not issue an operating time acquisition command to the respective physical drives 82 in which the usage state is "spare" or the power status is "spin-down."

Subsequently, the power estimation module 120 updates the drive operation recording table 123 based on the acquired operational information of the respective physical drives 82 (SP72). Specifically, the power estimation module 120 stores the VCM cumulative operating time and the head amp cumulative operating time acquired at step SP71 in the VCM cumulative operating time column 123B and the head amp cumulative operating time column 123C of the drive operation recording table 123, respectively.

The power estimation module 120 thereafter refers to the drive operation recording table 123 and calculates, for each physical drive 82, the ratio of the VCM cumulative operating time to the execution interval of the power estimation processing (this is hereinafter referred to as the "VCM operating ratio"), and the ratio of the head amp cumulative operating time to the execution interval of the power estimation processing (this is hereinafter referred to as the "head amp operating ratio") (SP73). Specifically, the power estimation module 120 calculates the VCM operating ratio by dividing the VCM cumulative operating time by the execution interval of the power estimation processing, and calculates the head amp operating ratio by dividing the head amp cumulative operating time by the execution interval of the power estimation processing.

Subsequently, the power estimation module 120 calculates, for each physical drive 82, the additional power caused by the operation of the VCM 97 (that is, caused by the seek operation) and the additional power caused by the operation of the head amp 95 (that is, caused by the data transfer) in the execution interval of the power estimation processing based on the HDD power specification management table 122 and the VCM operating ratio and the head amp operating ratio obtained at step SP73.

Specifically, the power estimation module 120 calculates the additional power "P_VCM" caused by the operation of the VCM 97 in the execution interval of the power estimation processing according to the following formula with the additional power caused by the operation of the VCM 97 as "P_VCM," the VCM operating ratio obtained at step SP73 as "R_VCM," and the additional power of the operation of the VCM 97 as "p_VCM."
[Math.6]

$$P\_VCM = R\_VCM \times p\_VCM \quad (6)$$

Moreover, the power estimation module 120 calculates the additional power "P_HA" caused by the operation of the head amp 95 in the execution interval of the power estimation processing according to the following formula with the additional power caused by the operation of the head amp 95 as "P_HA," the head amp operating ratio obtained at step SP73 as "R_HA," and the additional power of the operation of the head amp 95 as "p_HA."
[Math.7]

$$P\_HA = R\_HA \times p\_HA \quad (7)$$

For example, if the VCM operating ratio "R_HA" is 1/10, and the additional power "p_HA" caused by the operation of the VCM 97 of the physical drive 82 registered in the HDD power specification management table 122 is 4.9 W, 0.49 W as their multiplication result is calculated as the additional power "P_HA" caused by the seek operation in the execution interval of the power estimation processing. If the head amp operating ratio "R_HA" is 1/10, and the additional power "P_HA" caused by the head amp 95 of the physical drive 82 registered in the HDD power specification management table 122 is 1.9 W, 0.19 W as their multiplication result is calculated as the additional power "P_HA" caused by the data transfer in the execution interval of the power estimation processing.

Moreover, based on the operation result of Formula (6) and Formula (7), the power estimation module 120 calculates the total additional power "P_Dynamic" caused by the external access to the physical drive 82 according to the following formula.
[Math.8]

$$P\_Dynamic = P\_VCM + P\_HA \quad (8)$$

Accordingly, in the case of the foregoing example, since the additional power "P_HA" caused by the seek operation is 0.49 W, and the additional power "P_HA" caused by the data transfer is 0.19 W, the total additional power "P_Dynamic" in that physical drive 82 is calculated as 0.68 (equals 0.49 added to 0.19) W obtained by adding 0.49 W as the additional power caused by the seek operation and 0.19 W as the additional power caused by the data transfer.

Subsequently, the power estimation module 120 sends to the management terminal 4, as the power consumption information, the normal power consumption "P_Static" of each physical drive 82 acquired at step SP70, the additional power "P_VCM" caused by the operation of the VCM 97, the additional power "P_Xfer" caused by the operation of the head amp 95 and the total additional power "P_Dynamic" of each physical drive 82 calculated at step SP74 (SP75), and thereafter ends this power estimation processing.

The specific contents of the power consumption information to be sent from the power estimation module 120 to the management terminal 4 at step SP75 of the power estimation processing are shown in FIG. 29. As evident from FIG. 29, the power consumption information D2 includes the average power consumption of each physical drive 82, the additional power "P_VCM" caused by the operation of the VCM 97, the additional power "P_HA" caused by the operation of the head amp 95, and the normal power consumption "P_Static" during the period that the previous power consumption information D2 was sent until the current power consumption information D2 is sent. Incidentally, the average power consumption is obtained by adding the additional power "P_VCM" caused by the operation of the VCM 97, the additional power "P_HA" caused by the operation of the head amp 95, and the normal power consumption "P_Static."

The power consumption information D2 includes, in addition to the foregoing information, the average power consumption (average power loss caused by AC-DC conversion) in the power supply module 51 existing in the expansion enclosure 11 (FIG. 11). However, the average power consumption in the power supply module 51 (FIG. 1) is a fixed value that is obtained in advance.

The power consumption information D2 also includes the power of the overall expansion enclosure 11. The power of the expansion enclosure 11 is the sum of the average power consumption of the respective physical drives 82 and the respective power supply modules 51.

As described above, according to the computer system 80 of this embodiment, the power consumption of the respective physical drives 82 mounted in the storage apparatus can be estimated accurately, without having to use a wattmeter, based on the operational information concerning the VCM 97 and the head amp 95 internally recorded and retained by the respective physical drives 82. Consequently, it is possible to realize a computer system that is capable of easily and accurately estimating the power consumption of the physical drives 82 mounted in the storage apparatus 81 based on the operational status of the physical drives 82.

(3) Third Embodiment

Figure 30:
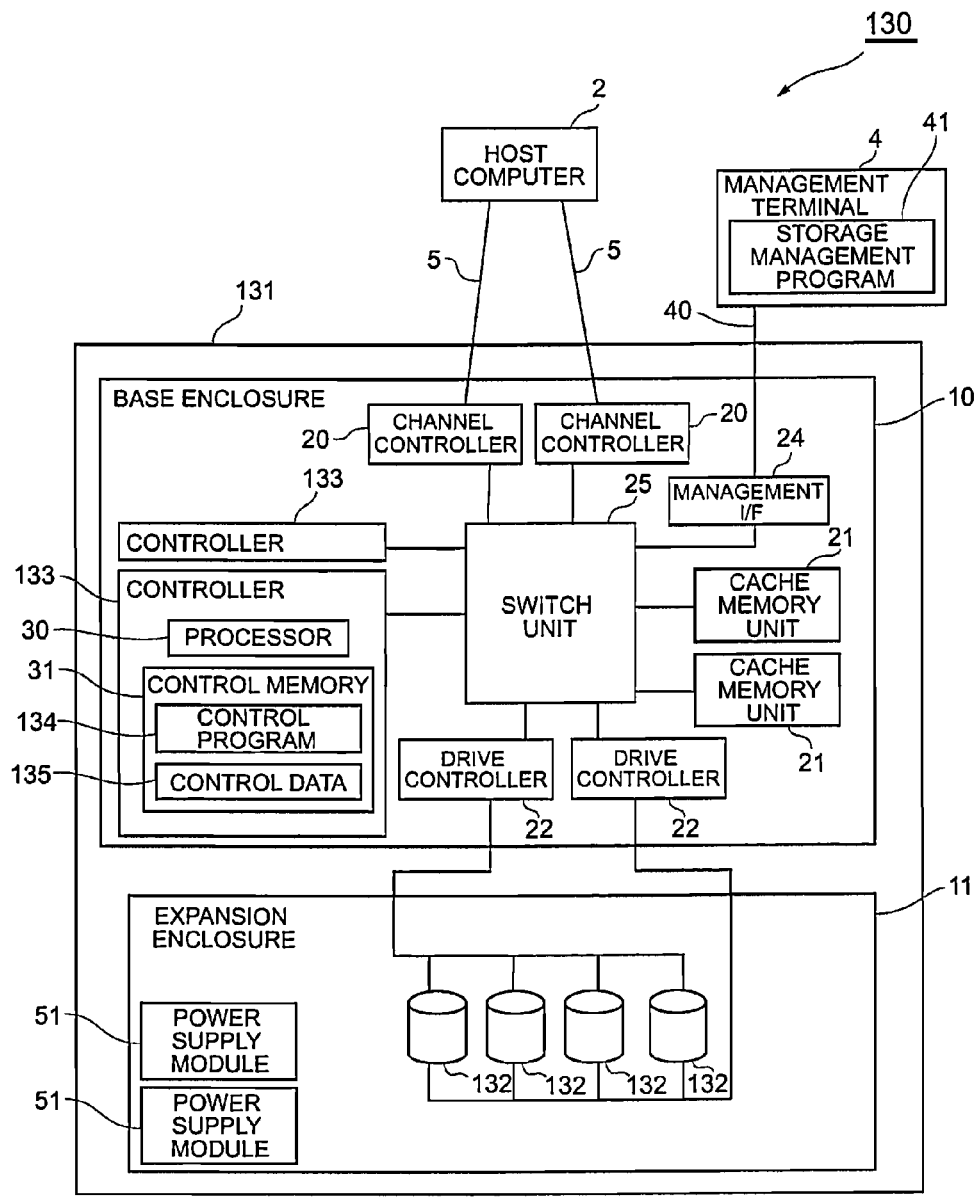
[FIG. 30] A block diagram showing the overall configuration of the computer system according to the third embodiment.

FIG. 30 having the same reference numerals for the components corresponding to those shown in FIG. 14 shows the computer system 130 according to the third embodiment. With the computer system 130, a part or all of the physical drives 132 mounted in the storage apparatus 131 are configured from a flash memory drive (this is hereinafter referred to as the "SSD (Solid State Drive)").

Figure 31:
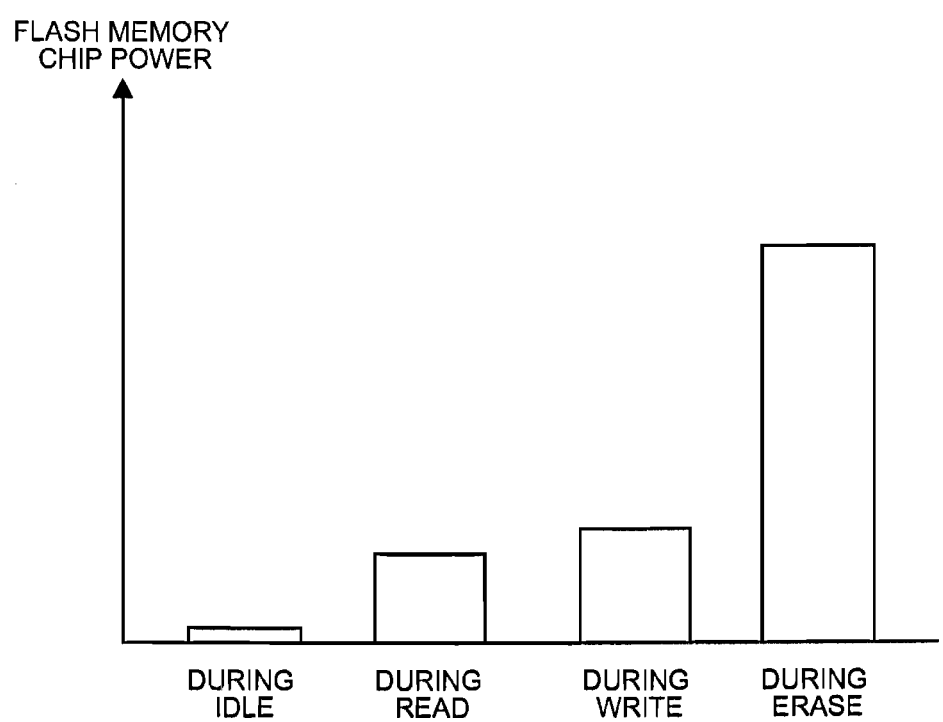
[FIG. 31] A conceptual diagram explaining the power consumption in the respective operation modes of the flash memory.

Here, FIG. 31 shows the amount of power consumption according to the operation state of the flash memory chip mounted in the SSD. As evident from FIG. 31, the amount of power consumption of the flash memory chip differs depending on the type of operation (idle operation, read operation, write operation and data erase operation).

In this embodiment, the power consumption that is required for the flash memory chip to execute the idle operation, read operation, write operation and data erase operation (these are hereinafter referred to as the "power consumption basic data") is respectively obtained in advance for each type of flash memory chip, and the number of flash memory chips that executed the operation is calculated for each type of operation (idle operation, read operation, write operation and data erase operation) inside the physical drive 132 configured from the SSD. One characteristic of this embodiment is that the additional power caused by the external access to the physical drive 132 is estimated based on the gathered operational information and the power consumption basic data.

Incidentally, in order to differentiate the physical drive 132 configured from an SSD and the physical drive 132 configured from a hard disk drive, as appropriate, the physical drive 132 configured from an SSD is referred to as the SSD physical drive 132, and the physical drive 132 configured from a hard disk drive is referred to as the HDD physical drive 132.

Figure 32:
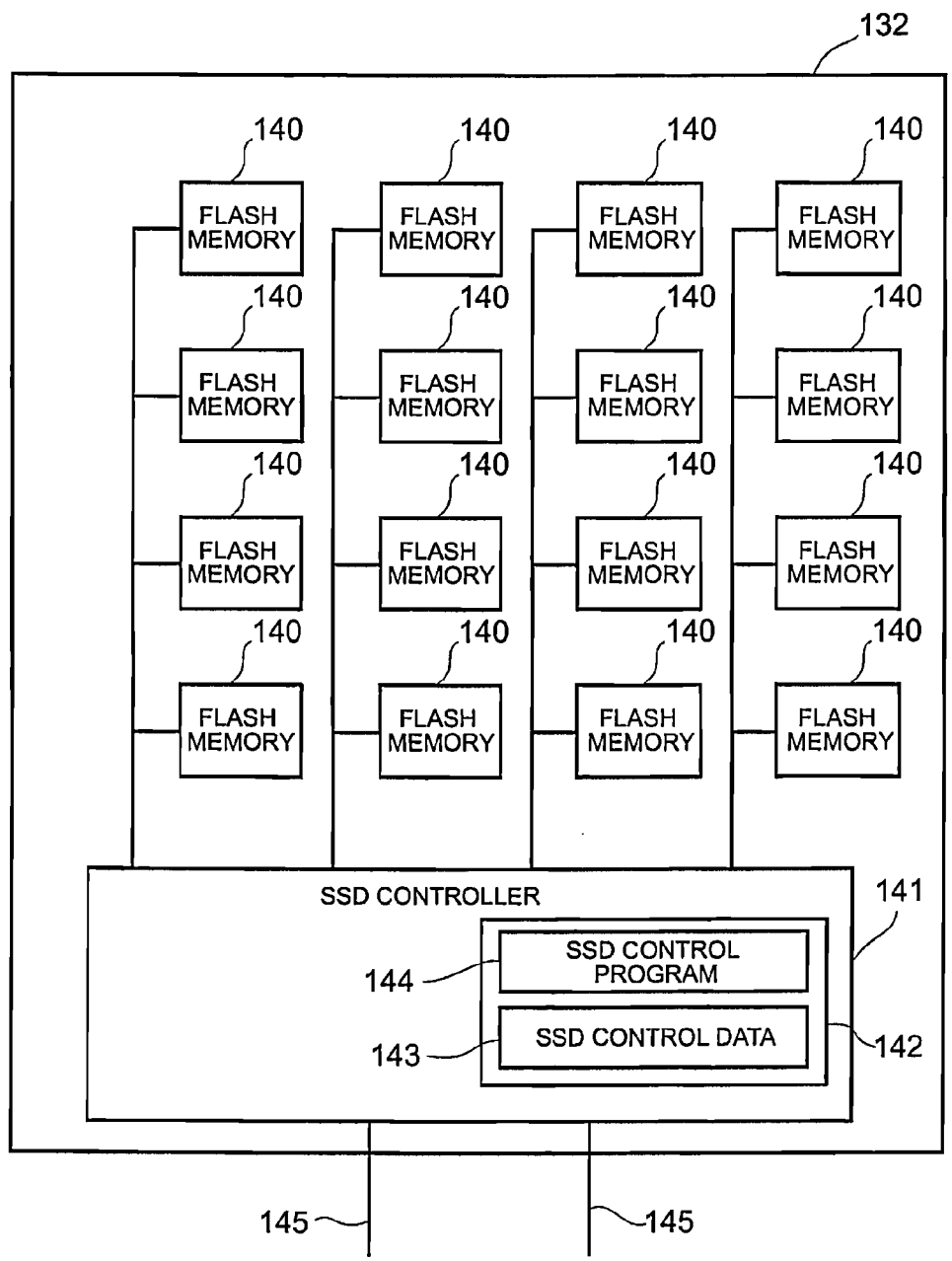
[FIG. 32] A block diagram showing the configuration of the SSD.

FIG. 32 shows the internal configuration of the SSD physical drive 132. The SSD physical drive 132 is primarily configured from one or more flash memory chips 140, and an SSD controller 141.

The flash memory chip 140 is a recording medium of a nonvolatile semiconductor, and is able to read and write data in pages units, and erase data in block units configured from a plurality of pages according to an external command. The SSD controller 141 is a processor for governing the control of the overall SSD physical drive 132, and retains SSD control data 143 and an SSD control program 144 in a control memory 142 provided internally. In addition, the SSD controller 141 receives a command from a higher-level device (in this example, the drive controller 22 of the storage apparatus 131) via the drive interface 145 (for example SCSI interface), and controls the interface with the flash memory chip 140 or executes processing for performing error correction.

Figures 33, 34:
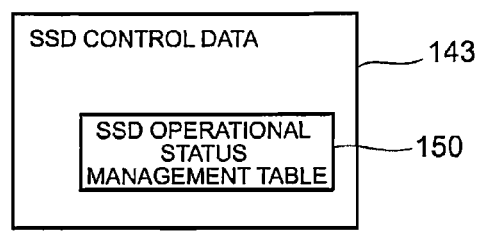
[FIG. 33] A conceptual diagram explaining the SSD control data.
[FIG. 34] A conceptual diagram explaining the SSD operational status management table.

The SSD control data 143 is control data to be used by the SSD storage control program 143 for controlling the SSD physical drive 132 and, as shown in FIG. 33, comprises an SSD operational status management table 150. The SSD operational status management table 150 is a table for managing the execution status of the respective types of operation in the self-SSD physical drive 132 and, as shown in FIG. 34, is configured from a read operation execution chip count column 150A, a write operation execution chip count column 150B and an erase operation execution chip count column 150C.

The read operation execution chip count column 150A stores the total number of flash memory chips 140 (FIG. 32) (this is hereinafter referred to as the "read operation execution chip count") to which the SSD control program 144 issued a read command in the SSD physical drive 132. The write operation execution chip count column 150B total number of flash memory chips 140 (this is hereinafter referred to as the "write operation execution chip count") to which the SSD control program 144 issued a write command in the SSD physical drive 132, and the erase operation execution chip count column 150C stores the total number of flash memory chips (this is hereinafter referred to as the "erase operation execution chip count") to which the SSD control program 144 issued a data erase command in the SSD physical drive 132. The foregoing operational information can be collected from the respective SSD physical drives 132 by using the operating chip count acquisition command, which is a dedicated command. The SSD physical drive 132 performs, as needed, reclamation processing of reproducing the invalid page area in the blocks as the erase unit of the flash memory. In the reclamation processing, the internal program of the SSD physical drive 132 performs the read operation or write operation in page units and the erase operation in block units. These operations are also reflected in the foregoing operational information.

Figure 35:
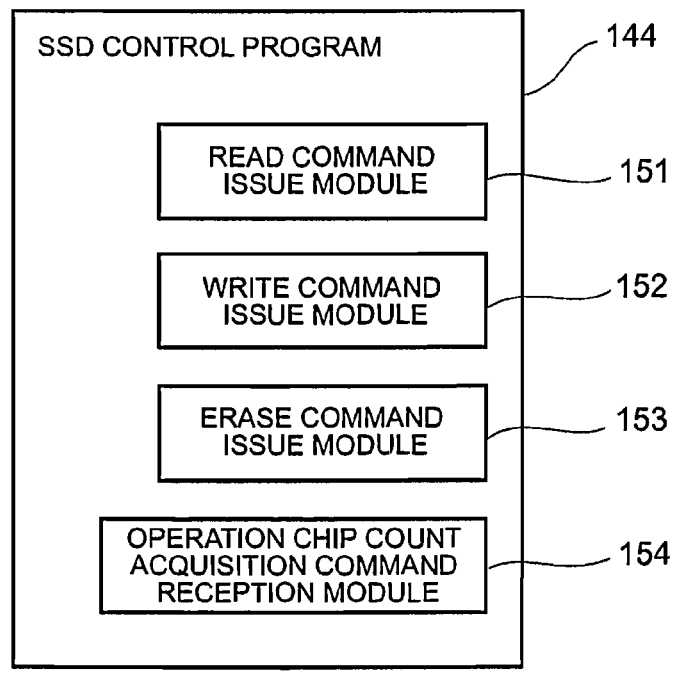
[FIG. 35] A conceptual diagram explaining the SSD control program.

The SSD control program 144 is a program for controlling the operation of the overall SSD physical drive 132 and, as shown in FIG. 35, is configured from a read command issue module 151, a write command issue module 152, an erase command issue module 153 and an operation chip count acquisition command reception module 154.

The read command issue module 151 is a program module for executing various types of processing concerning the read operation, and is started up by the SSD control program 144 upon issuing a read command to the flash memory chip 140 based on a command from the SSD controller 141 (FIG. 32).

Figure 36:
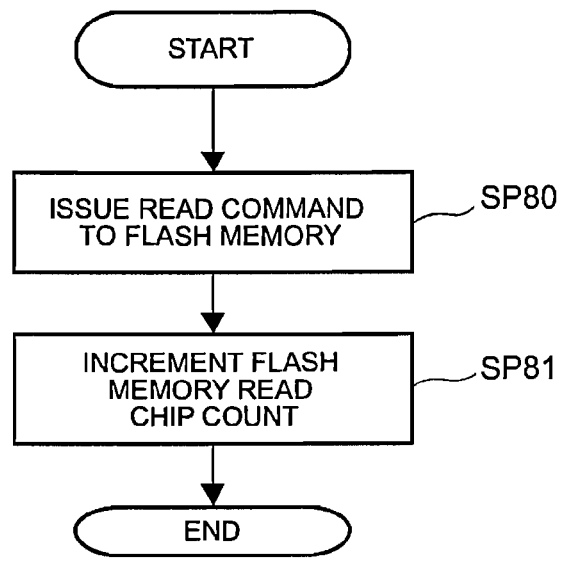
[FIG. 36] A flowchart showing the processing routine of the read command issue processing.

When the read command issue module 151 is started up by the SSD control program 144, according to the processing routine shown in FIG. 36, it issues a read command to the corresponding flash memory chip 140 (SP80), and thereafter increments (increases by "1") the value (this is hereinafter referred to as the "read operation execution chip count") that is stored in the read operation execution chip count column 150A of the SSD operational status management table 150 (FIG. 34) (SP81).

The write command issue module 152 is a program module for executing various types of processing concerning the write operation, and is started up by the SSD control program 144 upon issuing a write command to the flash memory chip 140 based on a command from the SSD controller 141.

Figure 37:
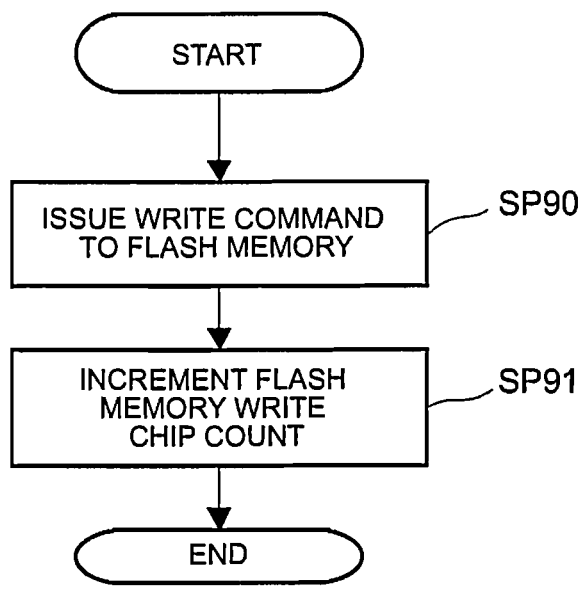
[FIG. 37] A flowchart showing the processing routine of the write command issue processing.

When the write command issue module 152 is started up by the SSD control program 144, according to the processing routine shown in FIG. 37, it issues a write command to the corresponding flash memory chip 140 (SP90), and thereafter increments the value (this is hereinafter referred to as the "write operation execution chip count") that is stored in the write operation execution chip count column 150B of the SSD operational status management table 150 (SP91).

The erase command issue module 153 is a program module for executing various types of processing concerning the data erase operation, and is started up by the SSD control program 144 upon issuing an erase command to the flash memory chip 140 based on a command from the SSD controller 141.

Figure 38:
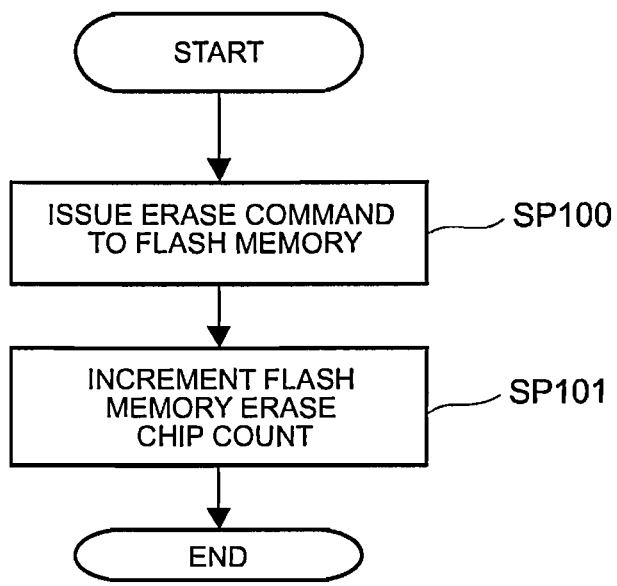
[FIG. 38] A flowchart showing the processing routine of the erase command issue processing.

When the erase command issue module 153 is started up with the SSD control program 144, according to the processing routine shown in FIG. 38, it issues an erase command to the corresponding flash memory chip 140 (SP100), and thereafter increments the value (this is hereinafter referred to as the "erase operation execution chip count") that is stored in the erase operation execution chip count column 150C of the SSD operational status management table 150 (SP101).

The operation chip count acquisition command reception module 154 is a program module for executing various types of processing upon receiving an operation chip count acquisition command sent from the outside, and is started up by the SSD control program 144 upon receiving the operation chip count acquisition command.

Figure 39:
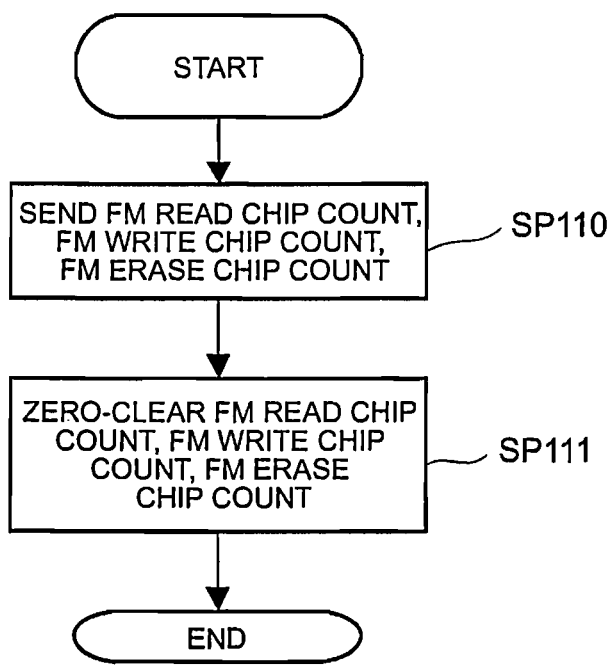
[FIG. 39] A flowchart showing the processing routine of the operating chip count acquisition command reception processing.

When the operation chip count acquisition command reception module 154 is started up by the SSD control program 144, according to the processing routine shown in FIG. 39, it respectively reads the read operation execution chip count, the write operation execution chip count and the erase operation execution chip count respectively stored in the read operation execution chip count column 150A, the write operation execution chip count column 150B and the erase operation execution chip count column 150C of the SSD operational status management table 150, and sends them to the sender of the operation chip count read command (SP110). Moreover, the operation chip count acquisition command reception module 154 respectively clears the read operation execution chip count, the write operation execution chip count and the erase operation execution chip count in the SSD operational status management table 150 (SP111) to "0."

Figure 40:
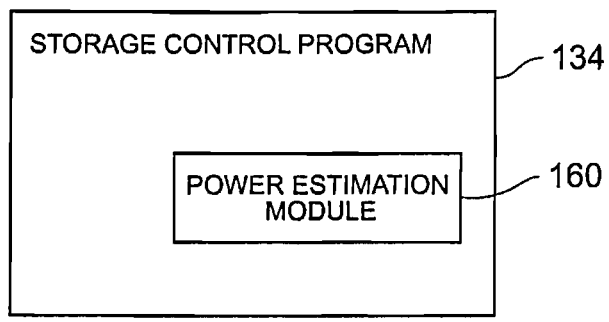
[FIG. 40] A. conceptual diagram showing the configuration of the storage control program according to the third embodiment.
Figures 41, 42:
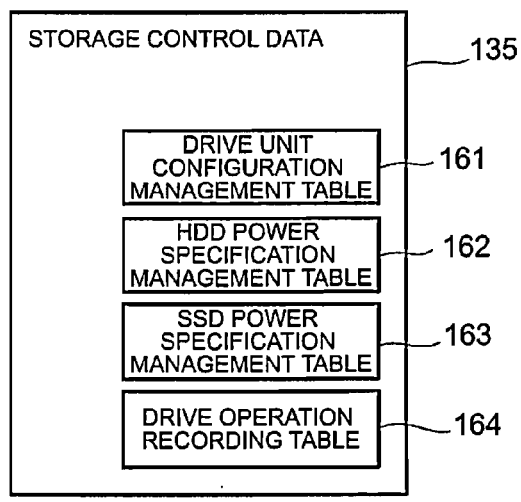
[FIG. 41] A conceptual diagram explaining the storage control data according to the third embodiment.
[FIG. 42] A conceptual diagram explaining the drive unit configuration management table according to the third embodiment.

Meanwhile, FIG. 40 shows the configuration of the storage control program 134 of the third embodiment stored in the control memory 31 of the controller 133 provided in the base enclosure 10 of the storage apparatus 131, and FIG. 41 shows the storage control data 136 of the third embodiment stored in the control memory 31.

The storage control program 134, as evident from FIG. 40, comprises a power estimation module 160. The power estimation module 160 is a program module including a function for estimating the power consumption increase caused by the external access to the respective physical drives 132 based on the operational information of the VCM 97 and the head amp 95 collected from the HDD physical drive 132, and the read operation execution chip count, the write operation execution chip count and the erase operation execution chip count collected from the SDD physical drive 132, and sending the estimation result to the management terminal 4.

The storage control data 135 comprises a drive unit configuration management table 161, an HDD power specification management table 162, an SDD power specification management table 163 and a drive operation recording table 164.

The drive unit configuration management table 161 is a table for recording the type and mount position of the physical drive 132 mounted in the storage apparatus 131 and, as shown in FIG. 42, is configured from a drive number column 161A, a drive model number column 161B, a drive type column 161C, a usage state column 161D and an HDD power status column 161E. The drive number column 161A, the drive model number column 161B, the usage state column 161D and the HDD power status column 161E respectively store the same information as the drive number column 61A, the drive model number column 61B, the usage state column 61C and the power status column 61D of the drive unit configuration management table 61 according to the first embodiment explained above with reference to FIG. 5. The drive type column 161C stores the type ("HDD" or "SSD") of the physical drive 132.

The drive unit configuration management table 161 is updated when a physical drive 132 is added or removed, or when the usage state of a physical drive 132 is switched, or when the spin-up or spin-down of a physical drive 132 is executed. The drive unit configuration management table 161 is referred to by the power estimation module 160 upon estimating the power.

The HDD power specification management table 162 is configured the same as the HDD power specification management table 122 according to the second embodiment described above with reference to FIG. 26, and the explanation thereof is omitted. The HDD power specification management table 162 is created in advance based on numerical values that are obtained from measurement or specification information that is announced by the manufacturer of the HDD physical drive 132, and is updated when an HDD physical drive 132 of a new model number is added. The HDD power specification management table 162 is referred to by the power estimation module 160 upon estimating the power.

The SSD power specification management table 163 is a table for retaining information concerning the power consumption in various states for each type of SDD physical drive 132 mounted in the storage apparatus 131 and, as shown in FIG. 43, is configured from a drive model number column 163A, an idle power column 163B, a read information column 163C, a write information column 163D and an erase information column 163E.

The drive model number 163A stores the model number of each SSD physical drive 132 that could be mounted in the storage apparatus 131. Incidentally, information stored in the drive model number column 163A may be information other than the model number of the physical drive 132 so as long as it is an identifier that is able to identify the respective physical drives 132 having different specifications concerning power. Moreover, the idle power column 163B stores the power consumption when the corresponding SSD physical drive 132 is in an idle state.

The read information column 163C, the write information column 163D and the erase information column 163E are respectively configured from additional power columns 163CA, 163DA, 163EA and required time columns 163CB, 163DB, 163EB. The additional power columns 163CA, 163DA, 163EA respectively store the additional power per flash memory chip 140 (FIG. 32) during the read operation, during the write operation or during the erase operation of the SSD physical drive 132 of the corresponding model number, and the required time columns 163CB, 163DB, 163EB respectively store the time required for the read operation, the write operation or the erase operation per flash memory chip 40 in the SSD physical drive 132 of the corresponding model number.

The SSD power specification management table 163 is created in advance based on numerical values that are obtained from measurement or specification information that is announced by the manufacturer of the SSD physical drive 132, and updated each time an SSD physical drive 132 of a new model number is added. Moreover, the SSD power specification management table 163 is referred to by the power estimation module 160 upon estimating the power.

The drive operation recording table 164 is a table for managing the operational status of the respective physical drives 132 (HDD physical drive 132 and SSD physical drive 132) during the period from the start of the power estimation processing described later and until the start of the subsequent power estimation processing and, as shown in FIG. 44, is configured from a drive number column 164A, a VCM cumulative operating time column 164B, a head amp cumulative operating time column 164C, a read operation execution chip count column 164D, a write operation execution chip count column 164E and an erase operation execution chip count column 164F.

The drive number column 164A stores the slot number of the respective slots to which each physical drive 132 (HDD physical drive 132 and SSD physical drive 132) is connected. The VCM cumulative operating time column 164B and the head amp cumulative operating time column 164C respectively store the cumulative operating time of the VCM 97 (VCM cumulative operating time) and the cumulative operating time of the head amp 95 (head amp cumulative operating time) in the HDD physical drive 132 collected from the corresponding HDD physical drive 132.

The read operation execution chip count column 164D, the write operation execution chip count column 164E and the erase operation execution chip count column 164F respectively store the total number of flash memory chips 140 (FIG. 32) that executed the read operation (read operation execution chip count), the total number of flash memory chips 140 that executed the write operation (write operation execution chip count), and the total number of flash memory chips 140 that executed the erase operation (erase operation execution chip count) in the SSD physical drive 132 collected from the corresponding SSD physical drive 132.

The drive operation recording table 164 is updated each time the power estimation module 160 collects corresponding information from the respective physical drives 132. The drive operation recording table 164 is referred to by the power estimation module 160 upon estimating the power.

Figure 45:
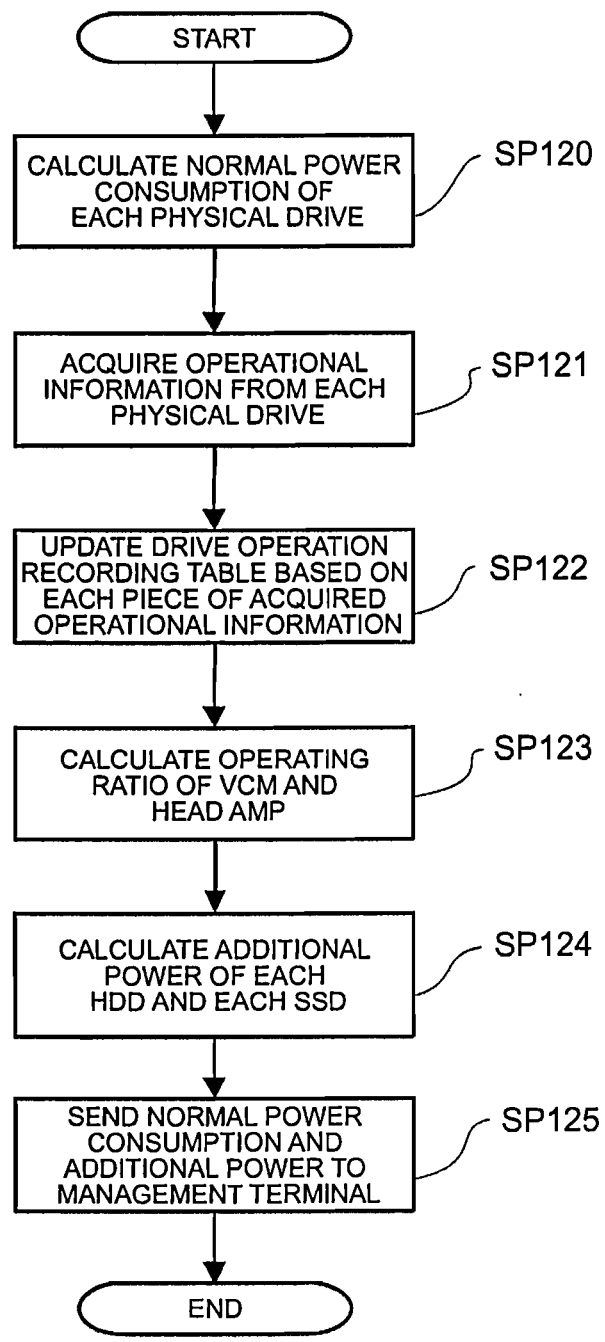
[FIG. 45] A flowchart showing the processing routine of the power estimation processing according to the third embodiment.

FIG. 45 shows the processing routine of the power estimation processing to be executed by the power estimation module 160 (FIG. 40). The power estimation module 160 is a program module for estimating the power consumption that is being consumed by the respective physical drives 132 of the storage apparatus 131 based on the various types of information stored in the drive operation recording table 164, and the various types of information stored in the drive unit configuration management table 161, the HDD power specification management table 162 and the SSD power specification management table 163, and sending the estimation result to the management terminal 4. The power estimation module 160 is started up by the storage control program 134 in prescribed time intervals (for instance, every minute), and executes the power estimation processing shown in FIG. 45.

Specifically, when the power estimation module 160 is started up by the storage control program 134, it foremost refers to the drive unit configuration management table 161, the HDD power specification management table 162 and the SSD power specification management table 163, and acquires the normal power consumption "P_Static" of the respective physical drives 132 (HDD physical drive 132 and SSD physical drive 132) (SP120).

Specifically, the power estimation module 160 reads the drive model number, the drive type and the power status for each entry of the drive unit configuration management table 161 (FIG. 42), and determines the type (HDD or SSD) of the physical drive 132 from the read drive type.

The power estimation module 160 refers to the corresponding entry of the HDD power specification management table 162 if the physical drive 132 is an HDD physical drive 132, and sets the value stored in the idle power column as the normal power consumption "P_Static" if the power status of the HDD physical drive 132 is a spin-up state, and sets the value stored in the spin-down power column as the normal power consumption "P_Static" if the if the power status of the HDD physical drive 132 is a spin-down state. Moreover, the power estimation module 160 refers to the corresponding entry of the SSD power specification management table 163 (FIG. 43) if the physical drive 132 is an SSD physical drive 132, and sets the value stored in the idle power column 163B as the normal power consumption "P_Static."

Subsequently, the power estimation module 160 acquires the operational information that is internally recorded in the physical drive 132 from the respective physical drives 132 in the storage apparatus 131 (SP121). Specifically, the power estimation module 160 reads the usage state and power status, respectively, for each entry of the drive unit configuration management table 161 and issues an operating time acquisition command to the respective HDD physical drives 132 in which the usage state is "in use" and the power status is "spin-up" in order to acquire the VCM cumulative operating time and the head amp cumulative operating time (refer to FIG. 17) which are internally recorded and retained by the respective HDD physical drives 132. The power estimation module 160 does not issue an operating time acquisition command to the respective HDD physical drives 132 in which the usage state is "spare" or the power status is "spin-down." Moreover, the power estimation module 160 reads the usage state for each entry of the drive unit configuration management table 161 and issues an operation chip count acquisition command to the respective SSD physical drives 132 in which the usage state is "in use" in order to acquire the read operation execution chip count, the write operation execution chip count and the erase operation execution chip count which are internally recorded and retained by the respective SSD physical drives 132. The power estimation module 160 does not issue an operating time acquisition command to the respective SSD physical drives 132 in which the usage state is "spare".

Subsequently, the power estimation module 160 updates the drive operation recording table 164 based on the acquired operational information of the respective physical drives 132 (SP122). Specifically, the power estimation module 160 stores the VCM cumulative operating time and the head amp cumulative operating time of the respective HDD physical drives 132 acquired at step SP121 in the corresponding VCM cumulative operating time column 164B and the head amp cumulative operating time column 164C of the drive operation recording table 164 (FIG. 44), respectively. Moreover, the power estimation module 160 stores the read operation execution chip count, the write operation execution chip count and the erase operation execution chip count of the respective SSD physical drives 132 acquired at step SP121 in the corresponding read operation execution chip count column 164D, the write operation execution chip count column 164E and the erase operation execution chip count column 164F of the drive operation recording table 164, respectively.

Subsequently, the power estimation module 160 refers to the drive operation recording table 164 and calculates the ratio of the VCM cumulative operating time to the execution interval of the power estimation processing (VCM operating ratio) and the ratio of the head amp cumulative operating time to the execution interval of the power estimation processing (head amp operating ratio) for each HDD physical drive 132 among the physical drives 132 mounted in the storage apparatus 131 (SP123). Specifically, the power estimation module 160 calculates the VCM operating ratio by dividing the VCM cumulative operating time by the execution interval of the power estimation processing, and calculates the head amp operating ratio by dividing the head amp cumulative operating time by the execution level of the power estimation processing.

Subsequently, the power estimation module 160 calculates the additional power caused by the external access for each HDD physical drive 132 and for each SSD physical drive 132 (SP124).

Specifically, for the respective HDD physical drives 132, the power estimation module 160 respectively calculates the additional power "P_VCM" caused by the operation of the VCM 97 and the additional power "P_HA" caused by the operation of the head amp 95 as with step SP74 of the power estimation processing according to the second embodiment described above with reference to FIG. 28. The power estimation module 160 calculates the additional power of the HDD physical drive 132 by adding the additional power "P_VCM" caused by the operation of the VCM 97 and the additional power "P_HA" caused by the operation of the head amp 95.

Moreover, the power estimation module 160 respectively calculates the additional power caused by the read operation, the additional power caused by the write operation and the additional power caused by the erase operation for each SDD physical drive 132 based on the SSD power specification management table 163 (FIG. 43) and the drive operation recording table 164 (FIG. 44) regarding the respective SSD physical drives 132, and calculates the additional power caused by the read operation, the write operation and the erase operation of the SSD physical drive 132 by adding the foregoing calculation results.

Specifically, the power estimation module 160 calculates the total value "P_Read" of the additional power caused by the read operation of the SSD physical drive 132 according to the following formula with the read operation execution chip count in the target SSD physical drive 132 acquired from the drive operation recording table 164 as "N_Read," the additional power caused by the read operation per flash memory chip 140 obtained from the SSD power specification management table 163 as "p_Read," the time required for the read operation per flash memory chip 140 obtained from the SSD power specification management table 163 as "t_Read," and the execution internal of the power estimation processing as "t_Int."
[Math.9]

$$P\_Read = (N\_Read \times p\_Read \times t\_Read)/t\_Int \quad (9)$$

Moreover, the power estimation module 160 calculates the additional power "P_Write" caused by the write operation of the SSD physical drive 132 according to the following formula with the write operation execution chip count in the SSD physical drive 132 acquired from the drive operation recording table 164 as "N_Write," the additional power caused by the write operation per flash memory chip 140 obtained from the SSD power specification management table 163 as "p_Write," and the time required for the write operation per flash memory chip 140 obtained from the SSD power specification management table 163 as "t_Read."
[Math.10]

$$P\_Write = (N\_Write \times p\_Write \times t\_Write)/t\_Int \quad (10)$$

In addition, the power estimation module 160 calculates the additional power "P_Erase" caused by the erase operation of the SSD physical drive 132 according to the following formula with the erase operation execution chip count in the SSD physical drive 132 acquired from the drive operation recording table 164 as "N_Erase," the additional power caused by the erase operation per flash memory chip 140 obtained from the SSD power specification management table 163 as "p_Erase," and the time required for the erase operation per flash memory chip 140 obtained from the SSD power specification management table 163 as "t_Erase."
[Math.11]

$$P\_Erase = (N\_Erase \times p\_Erase \times t\_Erase)/t\_Int \quad (11)$$

Then, the power estimation module calculates, based on the operation result of

Formula (9) to Formula (11), the total value "P_SSD Dynamic" of the additional power caused by the read operation, the write operation and the erase operation of the SSD physical drive 132 according to the following formula.
[Math.12]

$$P\_SSD\ Dynamic = P\_Read + P\_Write\ P\_Erase \quad (12)$$

Subsequently, the power estimation module 160 sends to the management terminal 4, as the power consumption information, the normal power consumption "P_Static" or "P_SSD Idle" of each physical drive 132 acquired at step SP120, and the additional power "P_Dynamic" of each HDD physical drive 132 and the additional power "P_SSD Dynamic" of each SSD physical drive 132 calculated at step SP124 (SP125), and thereafter ends this power estimation processing.

The specific contents of the power consumption information sent from the power estimation module 160 to the management terminal 4 at step S125 of the power estimation processing are shown in FIG. 46. As evident from FIG. 46, the power consumption information D3 includes the average power consumption of each physical drive 132, the additional power "P_Dynamic" or "P_SSD Dynamic" of each physical drive 132, and the normal power consumption "P_Static" or "P_SSD Idle" of each physical drive 132 during the period from the time that the previous power consumption information D3 was sent to the time that the current power consumption information D3 is sent. The average power consumption is obtained by adding the additional power "P_Dynamic" or "P_SSD Dynamic" in the corresponding physical drive 132 and the normal power consumption "P_Static" or "P_SSD Idle" of that physical drive 132.

The power consumption information D3 includes, in addition to the foregoing information, the average power consumption (average power loss caused by AC-DC conversion) in the power supply module 51 existing in the expansion enclosure 11 (FIG. 30). However, the average power consumption in the power supply module 51 (FIG. 1) is a fixed value that is obtained in advance.

The power consumption information D3 also includes the power of the overall expansion enclosure 11. The power of the expansion enclosure 11 is the sum of the average power consumption of the respective physical drives 132 and the respective power supply modules 51.

As described above, according to the computer system 130 of this embodiment, even with a physical drive (SSD physical drive) 132 that is configured from an SSD, the power consumption can be obtained based on the operational information that is internally recorded and retained by that physical drive 132 without having to use a wattmeter. Consequently, it is possible to realize a computer system that is capable of easily and accurately estimating the power consumption of the physical drives 50 mounted in the storage apparatus 3 based on the operational status of the physical drives 132.

(4) Other Embodiments

Although the foregoing first to third embodiments explained cases of applying the present invention to the storage apparatuses 3, 82, 131 configured as shown in FIG. 1, FIG. 14 or FIG. 30, the present invention is not limited thereto, and can also be broadly applied to storage apparatuses of various other configurations.

Moreover, although the foregoing first to third embodiments explained cases of configuring the operational information collection unit for collecting the operational information concerning the seek amount and data transfer amount in the physical drives 50, 82, 132 which are internally recorded and retained in the respective physical drives 50, 82, 132 configured from a hard disk drive and the power consumption estimation unit for estimating the power consumption of the respective physical drives 50, 82, 132 based on the collected operational information of the respective physical drives 50, 82, 132 from the processor 30 configuring the controllers 23, 83, 133 of the storage apparatuses 3, 81, 131 and the storage control programs 32, 84, 134 (specifically, the power estimation modules 60, 120, 160 configuring a part of the storage control programs 32, 84, 134) stored in the control memory 31 of the controllers 23, 83, 133, the present invention is not limited thereto, and the part that executes the function as the operational information collection unit and the part that executes the function as the power consumption estimation unit may also be provided separately.

Moreover, although the foregoing first to third embodiments explained cases of setting the power loss of the power supply module 51 disposed in the expansion enclosure 11 of the storage apparatuses 3, 81, 131 as a fixed value, the present invention is not limited thereto, and it may also be set as a variable according to the output load.

In reality, with a standard power supply module, the heavier the output load gets, the higher the power loss becomes. Thus, as a result of deciding the power loss of the power supply module 51 according to the total power consumption of all physical drives 50, 82, 132 as the output load, the total power consumption in the storage apparatuses 3, 81, 131 can be estimated even more accurately.

As a method of deciding the power loss of the power supply module 51 according to the total power consumption of all physical drives 50, 82, 132, the amount of power loss in relation to the output load of the power supply module 51 is obtained in advance by way of measurement or the like, and the obtained information is included, for instance, as a part of the control data 33, 85, 135 in the storage apparatuses 3, 81, 131 as a table (this is hereinafter referred to as the "power loss management table") 170 shown in FIG. 47. The power estimation modules 60, 120, 160 can thereby obtain the power loss of the power supply module 51 based on the total power consumption of all physical drives 50, 82, 132 obtained from the power estimation processing, and the foregoing power loss management table 170.

For example, if the total power consumption of all physical drives 50, 82, 132 in the expansion enclosure 11 is 250 W, since the power supply module 51 is made redundant, the output load of one power supply module 51 will be 125 W. Here, if the power loss management table 170 is interpolated, the power loss in the power supply module 51 can be obtained as 21 W.

Moreover, although the foregoing third embodiment explained a case of consolidating the HDD physical drive 132 and the SSD physical drive 132 in the storage apparatus 131 (FIG. 30), the present invention is not limited thereto, and the present invention can also be applied to cases where the physical drives 132 mounted in the storage apparatus 131 are all SSD physical drives 132.

INDUSTRIAL APPLICABILITY

The present invention can be applied to a storage apparatus equipped with one or more physical drives.

REFERENCE SIGNS LIST 1, 80, 130 Computer system
2 Host computer
3, 81, 131 Storage apparatus
4 Management terminal
23, 83, 133 Controller
30 Processor
32, 84, 134 Storage control program
33, 85, 135 Control data
50, 82, 132 Physical drive
51 Power supply module
60, 120, 160 Power estimation module
97 VCM
D1, D2, D3 Power consumption information

The invention claimed is:

1. A storage apparatus including one or more hard disk drives as a physical drive, and for providing a storage area of the one or more hard disk drives to a host computer, comprising:
an operational information collection unit for collecting in predetermined time intervals, from each of the hard disk drives:
the number of seek operations for each range upon sectionalizing a seek distance into a plurality of ranges;
the number of bytes of read data that was transferred; and
the number of bytes of write data that was transferred in the relevant hard disk drive which are internally recorded and retained by the respective hard disk drives;
a recording retaining unit for recording and retaining:
a maximum seek distance and a maximum data transfer amount for each type of the hard disk drives within the predetermined time;
the power during an idle state, additional power from the power during an idle state in a seek operation, and additional power from the power during an idle state in a data transfer for the each type of the hard disk drives;
a power consumption estimation unit for calculating in the predetermined time intervals, as the power consumption of the hard disk drives, the sum of first power consumption of the each of the hard disk drives which is calculated based on:
a ratio of a seek distance calculated from additional power of the number of seek operations for the each range that had been previously collected, to the maximum seek distance;
a ratio of a total value of additional power of the number of bytes of read data that was transferred and additional power of the number of bytes of write data that was transferred that had been previously collected, to the maximum data transfer amount;
the additional power from the power during the idle state in the seek operation; and
the additional power from the power during the idle state in the data transfer, and
second power consumption that is equal to the power during the idle state.

2. The storage apparatus according to claim 1,
wherein the maximum seek distance and the maximum data transfer amount are measured and set in advance.

3. A method for a storage apparatus including one or more hard disk drives as a physical drive, and for providing a storage area of the one or more hard disk drives to a host computer, the method comprising:
collecting by an operational information collection unit in predeterminded time intervals, from each of the hard disk drives:
the number of seek operations for each range upon sectionalizing a seek distance into a plurality of ranges;
the number of bytes of read data that was transferred; and
the number of bytes of write data that was transferred in the relevant hard disk drive which are internally recorded and retained by the respective hard disk drives;
recording and retaining by a recording retaining unit:
a maximum seek distance and a maximum data transfer amount for each type of the hard disk drives within the predetermined time;
the power during an idle state, additional power from the power during an idle state in a seek operation, and additional power from the power during an idle state in a data transfer for the each type of the hard disk drives;
calculating by a power consumption estimation unit for calculating in the predetermined time intervals, as the power consumption of the hard disk drives, the sum of first power consumption of the each of the hard disk drives which is calculated based on:
a ratio of a seek distance calculated from additional power of the number of seek operations for the each range that had been previously collected, to the maximum seek distance;
a ratio of a total value of additional power of the number of bytes of read data that was transferred and additional power of the number of bytes of write data that was transferred that had been previously collected, to the maximum data transfer amount;
the additional power from the power during the idle state in the seek operation; and
the additional power from the power during the idle state in the data transfer, and
providing second power consumption that is equal to the power during the idle state.

4. The method for a storage apparatus according to claim 3, wherein the maximum seek distance and the maximum data transfer amount are measured and set in advance.

* * * * *